US012491726B2

(12) United States Patent
Zavada et al.

(10) Patent No.: US 12,491,726 B2
(45) Date of Patent: *Dec. 9, 2025

(54) MACHINE LEARNING-IMPLEMENTED INKJET PROCESSING FOR GENERATION OF THREE-DIMENSIONAL RELIEF ON TILES

(71) Applicant: ELECTRONICS FOR IMAGING, INC., Londonderry, NH (US)

(72) Inventors: Mark Zavada, Wixom, MI (US); Matthew Tennis, Fenton, MI (US); David Weber, Middleton, WI (US); Alexander Meranto, Ferndale, MI (US); Carlos Carratalá, Vila-Real (ES); Fernando Tomás Badenes, Onda (ES); Louis Justus Fage, Redford, MI (US); Ursula Good, Jackson, MI (US); Paul Andrew Edwards, Kalamazoo, MI (US); Robert Roggers, Clinton, MI (US); John Hansen, Webberville, MI (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 256 days.

This patent is subject to a terminal disclaimer.

(21) Appl. No.: 18/360,719

(22) Filed: Jul. 27, 2023

(65) Prior Publication Data

US 2023/0364932 A1 Nov. 16, 2023

Related U.S. Application Data

(60) Continuation-in-part of application No. 18/304,171, filed on Apr. 20, 2023, which is a continuation of
(Continued)

(51) Int. Cl.
*B41M 5/00* (2006.01)
*B41J 2/21* (2006.01)
(Continued)

(52) U.S. Cl.
CPC ............... *B41M 5/007* (2013.01); *B41J 2/21* (2013.01); *B41M 5/0047* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 2,875,543 A | 3/1959 | Sylvester et al. |
| 3,804,657 A | 4/1974 | Eyman et al. |

(Continued)

FOREIGN PATENT DOCUMENTS

| BE | 462101 | 1/1946 |
| CN | 1420916 A | 5/2003 |

(Continued)

*Primary Examiner* — Manish S Shah
(74) *Attorney, Agent, or Firm* — PERKINS COIE LLP

(57) ABSTRACT

A technique is described for the application of three-dimensional (3D) relief to a substrate such as a ceramic tile using digital inkjet technology. A computer system receives information defining a relief pattern for forming the 3D relief using a digital inkjet printer. From the information, a feature vector is extracted comprising one or more features describing the 3D relief. A machine learning model is used to generate control commands based on the feature vector. The machine learning model is trained to generate the control commands to configure the digital inkjet printer to apply binder ink to a first region of a surface of the substrate. The applied binder ink is configured to form a protective layer over the first region of the surface of the substrate. The
(Continued)

digital inkjet printer is configured to apply solvent ink to the surface of the substrate.

20 Claims, 15 Drawing Sheets

Related U.S. Application Data application No. 17/085,069, filed on Oct. 30, 2020, now Pat. No. 11,633,972, which is a division of application No. 16/154,525, filed on Oct. 8, 2018, now Pat. No. 10,836,195.

(51) Int. Cl.
| | | |
|---|---|---|
| *B41M 7/00* | (2006.01) | |
| *C04B 41/86* | (2006.01) | |
| *C04B 111/00* | (2006.01) | |
| *C09D 11/322* | (2014.01) | |
| *C09D 11/36* | (2014.01) | |
| *C09D 11/40* | (2014.01) | |

(52) U.S. Cl.
CPC .............. *B41M 7/009* (2013.01); *C04B 41/86* (2013.01); *C09D 11/322* (2013.01); *C09D 11/36* (2013.01); *C09D 11/40* (2013.01); *C04B 2111/00181* (2013.01); *C04B 2111/00405* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | |
|---|---|---|
| 4,225,374 A | 9/1980 | Kaufmann |
| 5,946,220 A | 8/1999 | Lemelson |
| 6,402,823 B1 | 6/2002 | Garcia et al. |
| 2003/0034122 A1 | 2/2003 | Asai |
| 2004/0153204 A1 | 8/2004 | Blanco |
| 2010/0023155 A1 | 1/2010 | Conrad |
| 2010/0291362 A1 | 11/2010 | Vignali et al. |
| 2011/0169888 A1 | 7/2011 | Edwards et al. |
| 2012/0215340 A1 | 8/2012 | Conrad |
| 2013/0265376 A1 | 10/2013 | Gil-Torrente et al. |
| 2013/0310247 A1 | 11/2013 | Linhart et al. |
| 2014/0196618 A1* | 7/2014 | Pervan ........................ B41J 2/01 101/32 |
| 2014/0198170 A1 | 7/2014 | Pervan et al. |
| 2016/0016858 A1 | 1/2016 | Zavada et al. |
| 2016/0144612 A1 | 5/2016 | Pervan et al. |
| 2016/0311231 A1* | 10/2016 | Zavada ................ B41M 5/0047 |
| 2017/0107388 A1 | 4/2017 | Wang et al. |
| 2017/0218520 A1 | 8/2017 | De Mondt et al. |
| 2022/0197572 A1* | 6/2022 | Kamada ................. G06F 3/1257 |

FOREIGN PATENT DOCUMENTS

| | | |
|---|---|---|
| CN | 101896563 A | 11/2010 |
| CN | 106715607 A | 5/2017 |
| CN | 107683211 A | 2/2018 |
| CN | 108368367 A | 8/2018 |
| DE | 19623806 A1 | 12/1996 |
| GB | 1604635 A | 12/1981 |
| WO | 0151573 A1 | 7/2001 |
| WO | 2009077579 A1 | 6/2009 |
| WO | 2016050504 A1 | 4/2016 |
| WO | 2016172589 A1 | 10/2016 |
| WO | 2017070236 A1 | 4/2017 |

* cited by examiner

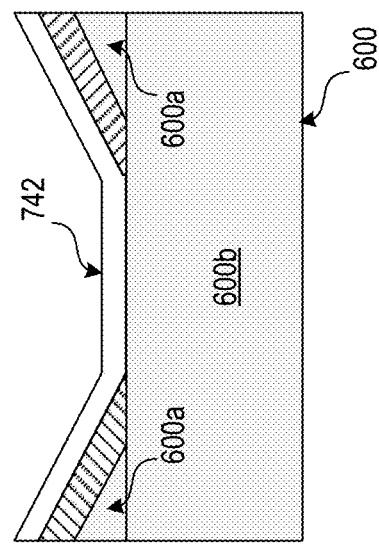
FIG. 7C
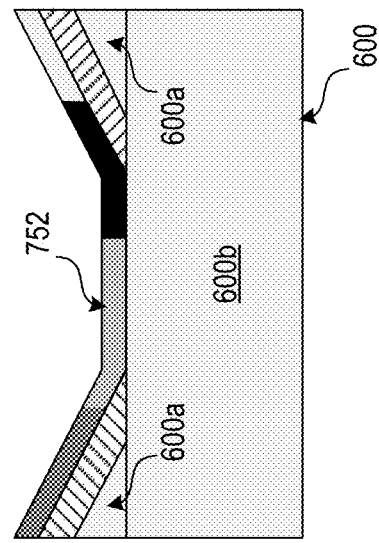
FIG. 7B
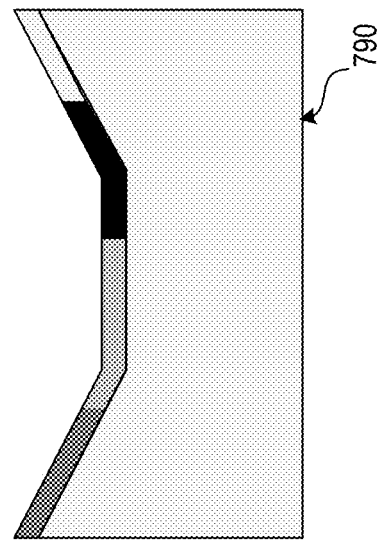
FIG. 7A
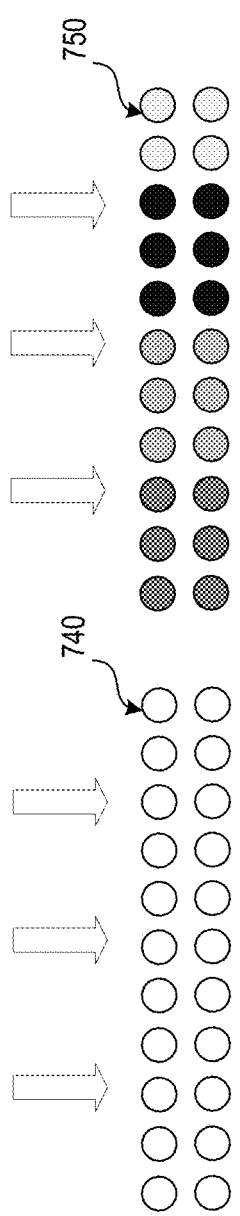

MACHINE LEARNING-IMPLEMENTED INKJET PROCESSING FOR GENERATION OF THREE-DIMENSIONAL RELIEF ON TILES

CROSS-REFERENCE TO RELATED APPLICATION(S)

This application is a continuation-in-part of U.S. patent application Ser. No. 18/304,171, filed on Apr. 20, 2023, which is a continuation of U.S. patent application Ser. No. 17/085,069, filed on Oct. 30, 2020, now U.S. Pat. No. 11,633,972, which is a divisional of U.S. patent application Ser. No. 16/154,525, filed on Oct. 8, 2018, now U.S. Pat. No. 10,836,195, and which are incorporated herein by reference in their entirety.

TECHNICAL FIELD

The present disclosure generally relates to processing techniques for forming textured relief in substrates such as ceramic tiles.

BACKGROUND

Tiles have a wide range of applications as building materials (e.g., for flooring) or as decorative objects. Various processes have been developed to apply three-dimensional (3D) relief to tiles, for example, to improve functionality and/or add ornamentation. Existing approaches for adding 3D relief to a tile include digital processes such as: additive processes whereby ceramic material is applied to the surface of a tile, subtractive-like processes whereby a ceramic fluxing material is applied to the glazed surface of a tile, and wax-resist processes whereby a wax-like material is applied to the surface of a tile prior to glazing, as well as analog stamping processes whereby tile body powders are pressed in a mold.

BRIEF DESCRIPTION OF THE DRAWINGS

FIGS. 7A-7C show a sequence of illustrative diagrams depicting processing of the second substrate according to the process of FIG. 3.

DETAILED DESCRIPTION

Overview

Figure 1:
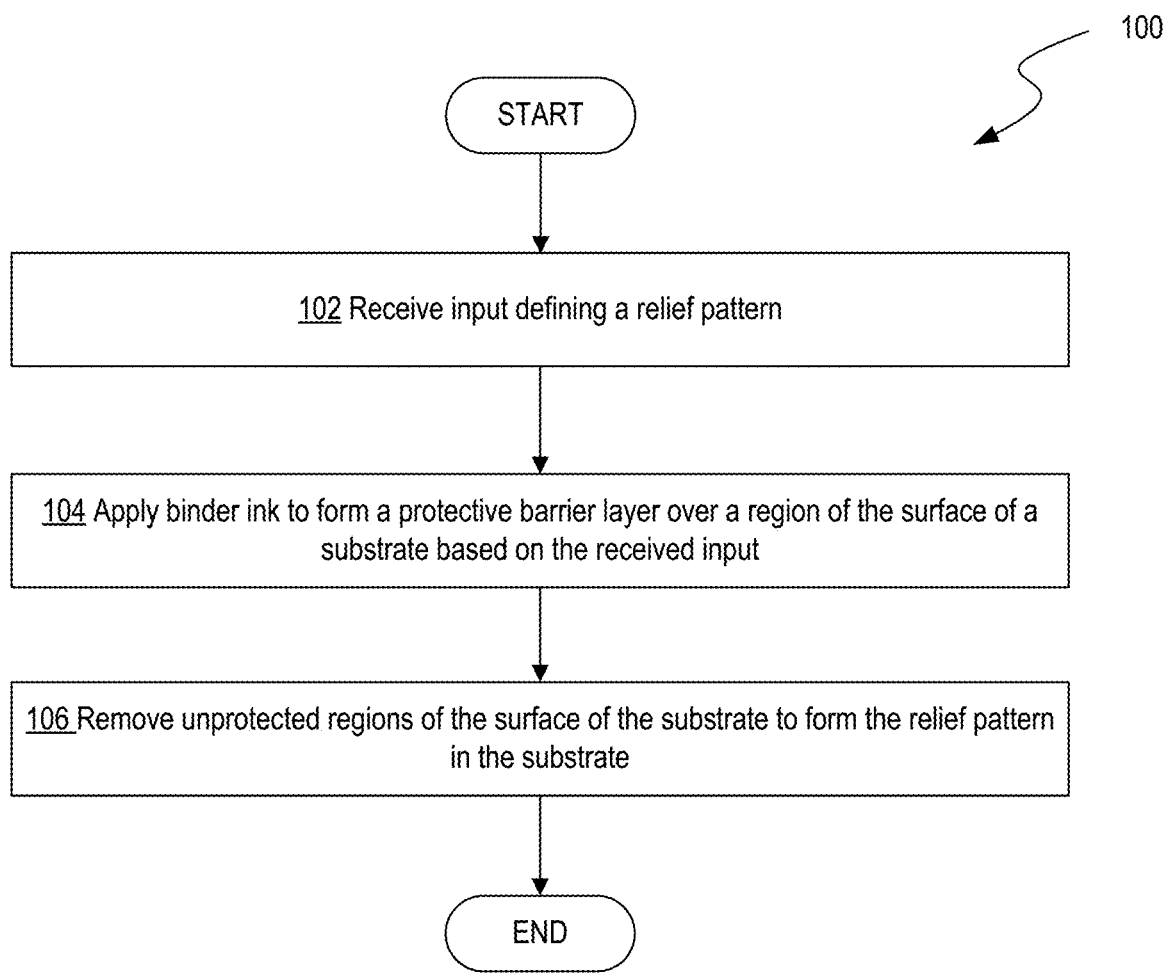
FIG. 1 shows a flowchart illustrating a first example process for applying a three-dimensional (3D) relief to a substrate using digital inkjet technology.

Existing approaches for adding 3D relief to tiles have several drawbacks. For example, current digital processes (additive, subtractive, etc.) result in subtle, poorly defined relief effects due to technological limitations. Further, existing digital processes involving subtractive methods (i.e., sinking ink) typically involve the use of heavy metals that are both toxic and significantly more expensive to generate. Existing analog stamping processes can result in more well-pronounced 3D relief patterns as compared to existing digital processes. However, existing analog stamping processes allow for limited variation in relief patterns since every stamped tile will have the same relief pattern until the stamping mold is changed. Generating new stamping models is costly and changing between stamping molds during processing is both time and labor intensive.

Introduced herein is technique for applying 3D relief to substrates such as tiles using a digital inkjet technology that addresses the above-mentioned problems with existing approaches. In an example embodiment, the introduced technique includes applying binder ink to a portion of the surface of a substrate (e.g., a tile) using a digital inkjet process. This binder ink forms a barrier layer that protects the portion of the surface of the substrate. Next, a brushing process is applied to remove unprotected portions of the substrate, thereby forming the 3D relief in the substrate.

The incorporation of inkjet technology in the introduced technique eliminates the need for expensive stamping molds while still maintaining the durability of the surface of the substrate unlike existing digital processes. For production efficiency, the introduced technique avoids the added time and labor needed to stop production to change relief designs, reducing production costs and opens more design variability, for example, to mimic the look of "natural" materials. Further, the introduced technique allows for the matching of relief patterns to digitally printed color designs later in the production process, thereby improving design quality and enabling designers to diversify their product offerings.

TERMINOLOGY

Substrate: A "substrate" refers to any material upon which the disclosed technique for forming a 3D relief can be applied. In example embodiments, the substrate includes an absorbent layer of material upon which ink can be applied using an inkjet process and that can be removed, for example, using a physical process such as brushing. Examples of substrates include hydraulically pressed ceramic green tile (single or double charged), glazed surface, or any other preparation with similar characteristics. The substrate includes at least one (e.g., a top surface) surface upon which the disclosed technique for relief formation is applied. In some embodiments, the surface of the substrate is flat or at least substantially flat (i.e., little change in elevation (e.g., on the order of ±1 millimeter) relative to the length and/or width of the surface of the substrate) although the surface need not be flat in all embodiments.

Relief: Relief generally refers to a difference in elevation on a surface. As used herein, the terms "relief" or "3D relief" may refer to the difference in elevation of the surface of the substrate resulting from the disclosed technique whereby material is removed from certain regions of the surface of the substrate. The pattern formed in the surface of the substrate by the removal of material from certain regions of the substrate is referred to herein as a "relief pattern." As will be described in more detail, the relief pattern can be defined based on a digital image. The relief formed in the substrate may exhibit various characteristics such as depth and gradient. The depth of the relief may be defined as a vertical distance relative to the original surface of the substrate. For example, the disclosed technique may involve removing material up to a particular depth relative to the original surface of the substrate. The relief may also exhibit a gradient based on a ratio between a horizontal distance and a difference in elevation between two points. The gradient may exhibit a constant slope or a slope that varies over the horizontal distance between the two points.

Inkjet Printing: Inkjet printing generally refers to the process of recreating a digital image by propelling droplets of ink fluid onto a substrate. Methods of inkjet printing include continuous inkjet (CIJ), thermal drop-on-demand (DOD) and piezoelectric DOD.

Binder Ink Fluid: Binder ink fluid or simply "binder ink" refers to any fluid that can function to protect material of the substrate (e.g., substrate powders) when applied. In some embodiments, the binder ink is a fluid that can be applied to the substrate using an inkjet printing to form a protective layer on the substrate. In the context of ceramic tile substrate, the binder ink is used to strengthen and protect the ceramic powders in regions of the surface of the tile where it is applied. The binder ink fluid may comprise a resin/polymer aqueous-based or solvent-based solution with properties suitable for use by an inkjet printer. Depending on the specific implementation, the binder ink fluid may include or be used in combination with other materials such as curable materials (e.g., ultraviolet (UV), thermal, two-part, etc.), low melting point waxes, polymers, dispersed particles, or silanes. The binder ink fluid can be substantially transparent or may include a dye or some other pigment to allow the placement of binder ink fluid on the substrate to be observed after application. In a ceramic process, any dye or pigment in the binder ink fluid may be organic-based to allow for removal through incineration during the kiln firing process.

Solvent Ink Fluid: Solvent ink fluid or simply "solvent ink" can be applied, for example using an inkjet process, on top of the protective layer formed by the binder ink, to produce gradient 3D relief formations. When applied, the solvent ink forces the binder ink into substrate. The solvent ink fluid may comprise any type of solution capable of temporarily dissolving the resin (or other material) used for the binder ink. Solvent ink fluids for aqueous and polar-solvent binder inks may comprise, for example, blends of any one or more of the following example solvents: water, ethylene glycol, glycerin, ethylene glycol ethyl ether, diethylene glycol ethyl ether, propylene glycol, dipropylene glycol, dipropylene glycol methyl ether, tripropylene glycol, propylene glycol methyl ether, n-methyl-2-pyrrolidone, methanol, ethanol, isopropanol, n-propanol, butanols, ethyl lactate, acetone and other polar solvents. Solvent ink fluids for mid- to non-polar binder inks may comprise, for example, blends of any one or more of the following solvents: aliphatic hydrocarbon distillates, ethyl acetate, propylene glycol butyl ether, dipropylene glycol methyl ether, dipropylene glycol butyl ether, tripropylene glycol methyl ether, ethylene glycol butyl ether, diethylene glycol butyl ether, methyl ethyl ketone, toluene, xylenes, tetrahydrofuran, methyl amyl ketone, cyclohexanone, and other non-polar solvents.

Brushing: After the binder ink sets, thereby forming a protective layer over the printed regions of the surface of the substrate, a brushing process is applied to physically remove material from the unprinted (i.e., unprotected) regions of the surface of the substrate. This process of removing material from certain regions of the surface of the substrate forms the 3D relief.

Glazing: A glaze may be applied as a post-process after forming the 3D relief according to the disclosed technique. Application of a glaze is typically used in ceramics for decoration (e.g., to add gloss, texture, or color), to seal porous surface, and/or to add an additional layer of protection against wear. The glaze may comprise any material suitable for the underlying substrate and may be applied using known glazing processes such as spray, waterfall, or digital inkjet.

Color Printing: Color printing may be applied as a post-process after forming the 3D relief and/or applying a glaze to add decorative color. Color printing can be applied, for example, using digital inkjet printing (as described above) or by using analog techniques such as gravure, screen printing, etc.

Firing: Firing, in the context of ceramic processing, generally refers to the process of applying heat to the material (e.g., clay and any added glaze) of a "green" substrate to form a final ceramic product. A typical industrial ceramic tile process involves firing for approximately 1-2 hours at a temperature between 1030° C. and 1250° C.

Example Processes for Applying 3D Relief to a Substrate Using Digital Inkjet Technology FIG. 1 is a flowchart illustrating a first example process 100 for applying 3D relief to a substrate using digital inkjet technology. Certain steps of the example process 100 are described with reference to FIGS. 2A-2C which show a sequence of illustrative diagrams depicting processing of a substrate according to the introduced technique. Certain steps of the example process 100 depicted in FIG. 1 may be performed by one or more components of the automated production system 800 depicted in FIG. 8 and/or the example computing system 900 depicted in FIG. 9. The process 100 described with respect to FIG. 1 is an example provided for illustrative purposes and is not to be construed as limiting. Other processes may include more or fewer steps than depicted while remaining within the scope of the present disclosure. Further, the steps depicted in example process 100 may be performed in a different order than is shown.

Example process 100 begins at step 102 with receipt of an input which defines the relief pattern which will be applied to a substrate such as a ceramic tile. The substrate can include polyvinyl chloride (PVC), polymethyl methacrylate (PMMA), acrylonitrile butadiene styrene (ABS), or luxury vinyl tile (LVT). PVC is a synthetic plastic polymer. PMMA, also known as acrylic, acrylic glass, or plexiglass, is a transparent thermoplastic used in sheet form as a lightweight or shatter-resistant alternative to glass. ABS is a common thermoplastic polymer having favorable mechanical properties such as impact resistance, toughness, and rigidity. LVT is a finished flooring material used in commercial and institutional applications. LVT is composed of colored PVC chips formed into solid sheets of varying thicknesses by heat and pressure. The embodiments disclosed herein can be implemented in the LVT market and for construction that requires a post-print finishing thermo-lamination or bonding process of digitally printed films to rigid core materials. Additional printing applications using ABS, PVC, and PMMA also benefit from the disclosed embodiments, including shower and bath enclosures, automotive interior trim, secure credit cards, and luxury boats and yachts.

The input received at step 102 may include, for example, a digital image of a design upon which the relief pattern will be based. The digital image may comprise any type of data that can be processed by a computer processing system (e.g., processing system 900) to define a relief pattern to be applied to a substrate using the introduced technique. In some embodiments, the digital image may be a monochrome image of a design defining a certain area corresponding to the relief pattern to be printed. In some embodiments, the digital image may be a polychrome image which defines both the relief pattern to be applied as well as coloring (e.g., through color inkjet printing) as a post-process after applying the relief.

In some embodiments, the input received at step 102 may include parameters associated with the processes to be applied to the substrate. For example, such parameters may include a type of substrate (e.g., material type, dimensions, etc.), dimensions of the relief to apply (e.g., depth, gradient, etc.), selections of post-processes to apply (e.g., glazing, color printing, firing, etc.), or any other relevant parameters. Parameters may be input by a user, for example, via a computing device, or received from other components of an automated production system.

Although not depicted in FIG. 1, in some embodiments, step 102 may include processing data (e.g., data included in the received inputs) by a computer processing system. For example, step 102 may include image processing to prepare a received digital image for use in defining a relief pattern. As an illustrative example, a digital image including a design in black against a white background defining a relief pattern may be processed to invert color values such that the printed portions (i.e., the black portions of the image) define areas of the substrate which will be protected from removal, for example, by brushing.

Figure 2C:
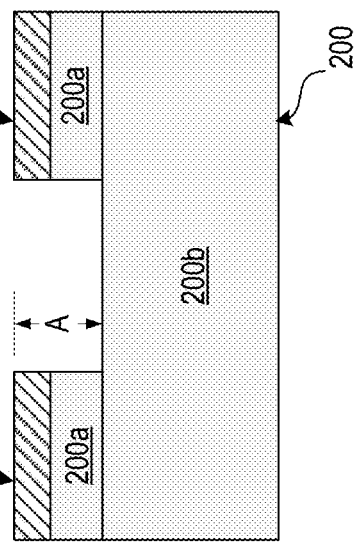
FIGS. 2A-2C show a sequence of illustrative diagrams depicting processing of a first substrate according to the process of FIG. 1.

Example process 100 continues at step 104 with applying binder ink to form a protective layer over a region of the surface of a substrate based upon the received input. FIG. 2A shows a profile view of a substrate 200 and FIG. 2B shows a profile view of the same substrate 200 with binder ink applied to form a protective layer over a region of the surface of the substrate 200.

As previously discussed, in some embodiments, the substrate 200 may be a ceramic tile. The example substrate 200 depicted in FIGS. 2A-2B is multi-layered and includes at least a top layer 200a and a bottom layer 200b. The top layer 200a may be a double charge layer of a double charge vitrified tile. Double charged tiles are typically thicker than standard tiles by a few millimeters (mm) making them well suited to generating relief through subtractive processing. However, a person having ordinary skill in the art will recognize that introduced technique can similarly be applied to substrates having more or fewer than two layers. Further, the depth of the top layer 200a may be exaggerated in FIGS. 2A-2C relative to the depth of the bottom layer 200b for illustrative clarity. In the case of a double charged tile, which typically has a total thickness of approximately 5-10 mm, the top layer 200a (or double charge layer) will typically account for approximately 10-30% of the total thickness.

Figure 2B:
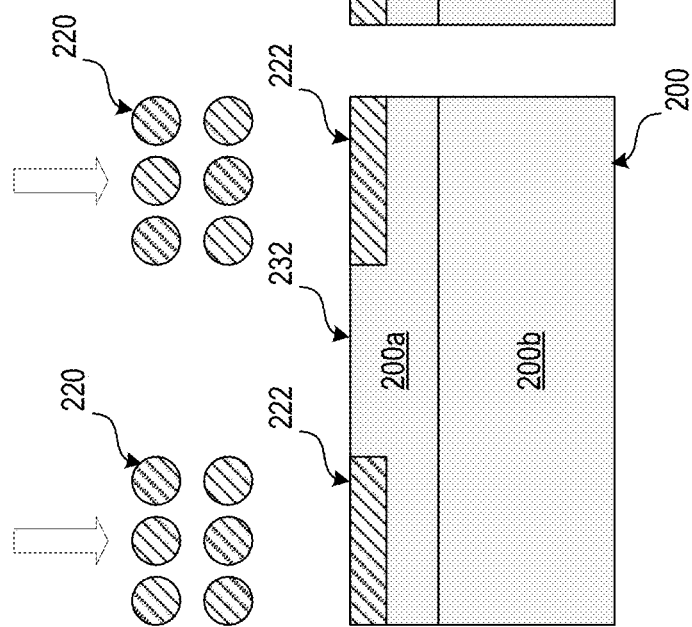
Figure 2A:
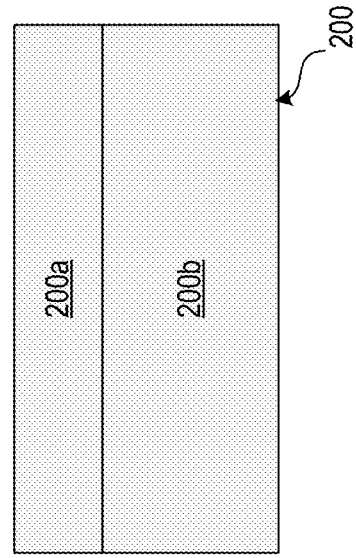

As depicted in FIG. 2B, the binder ink can be applied using an inkjet process which involves propelling droplets 220 of the binder ink into the surface of the substrate 200. The droplets of binder ink 220 are represented by circles that are exaggerated in size relative to the substrate. The typical size of the inkjet droplets is on the order of several microns. The droplets 220 of binder ink are applied to the surface of the substrate 200 via a digital inkjet process to recreate (i.e., print) the digital image (or processed version thereof) received as an input at step 102 of example process 100. In other words, a digital inkjet printer prints a digital image on the surface of the substrate 200 using binder ink. As a result, the surface of the substrate 200 includes regions 222 which are covered in a layer of binder ink and unprotected regions 232 which are not covered in a layer of binder ink.

Note that the protected layer covering regions 222 of the substrate 200 is depicted as extending into the surface of the substrate 200 (the regions of diagonally hatched lines) as opposed to resting on top of the surface of the substrate 200. This may be due to absorption of the binder ink by the porous material of the substrate 200. In other embodiments involving non-porous or less-porous material, the binder ink may instead rest on top of the surface of the substrate. In any case, the depth to which the binder ink is absorbed into the surface of the substrate will depend on a number of factors including the force of the inkjet process, the amount of ink applied, and the porosity of the substrate surface. Further, the depth to which the binder ink is absorbed may be exaggerated in FIGS. 2B and 2C for illustrative clarity and is not necessarily indicative of actual absorption.

Although not depicted in FIG. 1, in some embodiments example process 100 may include waiting for the binder ink to dry or actively applying another process, such as a curing process to finalize formation of the protective layer over certain regions of the surface of the substrate. For example, in some embodiments the binder ink may include or be combined with a curable agent which requires a curing process (e.g., application of heat, UV light, etc.) to form the protective layer.

Once a protective layer is formed by application of the binder ink, example process 100 proceeds to step 106 which includes removing unprotected regions of the surface of the substrate to form the relief pattern in the substrate. For example, FIG. 2C shows the removal of material from the substrate 200 in the unprotected region 232 between the protected regions 222.

In some embodiments, step 106 is performed by brushing away material from the unprotected region 232 of the surface of the substrate. Brushing may be applied manually or preferably automatically using any type of brushing device. Brushes may comprise fibers (e.g., cotton, polyester, polyamide, polyethylene, polyacrylonitrile, polypropylene, wool, or animal hair) that are affixed to rotatable drums or circular pads. The physical properties of the brushes used in the brushing process will depend on several factors such as the type of substrate, the manufacturing process, or decorative requirements. For example, a looser substrate powder, slower production speed, and simple design may require a less aggressive brushing process to achieve a desired decorative effect. In some embodiments, a brushing process is applied to the entire surface of the substrate, but the total brushing area may also be limited depending on the desired decorative effect.

In some embodiments, the removal of material from the substrate at step 106 may be performed using non-contact processes such as compressed air (i.e., air-knife) or powder vacuum. In some embodiments, such non-contact processes may be combined with a mechanical brushing to remove material from the surface of the substrate.

As shown in FIG. 2C, removal of material from the unprotected region 232 of the substrate 200 results in the formation of a 3D relief of depth A relative to the original surface of the substrate 200. In the example depicted in FIG. 2C, the depth A of the 3D relief is equal to the thickness of the top layer 200a of the substrate; however, this may not be the case in all embodiments. For example, in some embodiments, the material of the top layer 200a may exhibit different properties than the material of the bottom layer 200b and the removal process (e.g., brushing) may be specifically calibrated to only remove the material of the top layer 220a. Alternatively, or in addition, the removal process may be calibrated (e.g., based on user input received at step 102) to remove material up to a specified depth A that may differ from the thickness of the top layer 200a. As further depicted in FIG. 2C, the 3D relief formed by the removal process is defined by vertical side walls at right angles to the original horizontal surface of the substrate 200. In other words, the 3D relief depicted in FIG. 2C does not exhibit a gradient. As will be described later, in some embodiments, the process for forming the 3D relief can be altered slightly to impart such a gradient.

The example process 100 described with respect to FIGS. 2A-2C shows the protective layer of binder ink remaining in place after the 3D relief is formed. The binder ink may remain in the substrate until it either evaporates way or is burned away, for example, during a kiln firing process.

Alternatively, in some embodiments this protective layer of binder ink may be removed from the surface of the substrate after the 3D relief is formed, for example, by applying a solvent. The binder ink may be actively removed through application of a solvent if, for example, the presence of such binder ink on the surface of the substrate would interfere with other processes such as glazing or color decoration. In some embodiments, the solvent used to remove the layer of binder ink may be the same solvent or similar solvent used to form the gradient relief.

Figure 3:
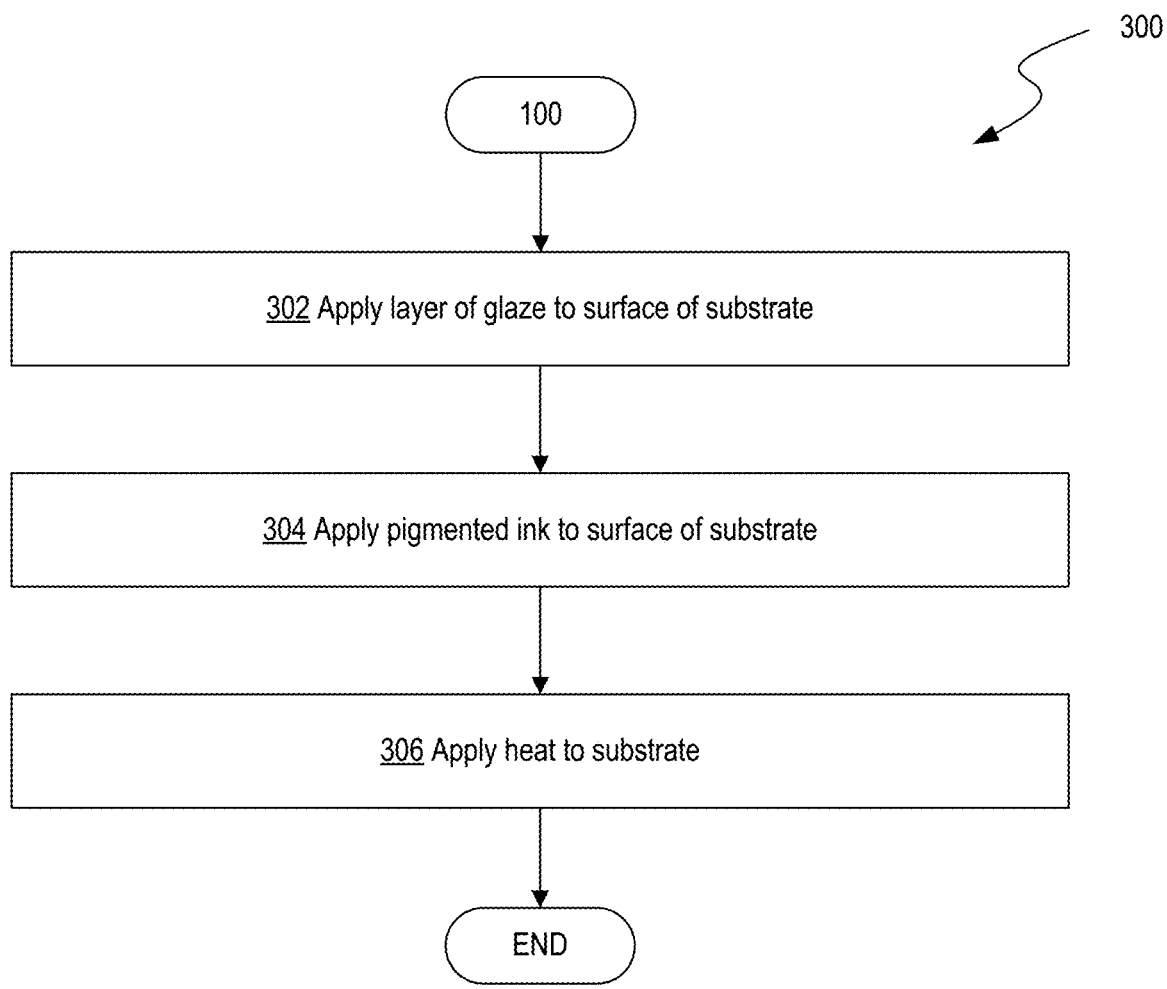
FIG. 3 shows a flowchart illustrating an example process that can be applied to the substrate after the 3D relief has been formed.
Figure 4:
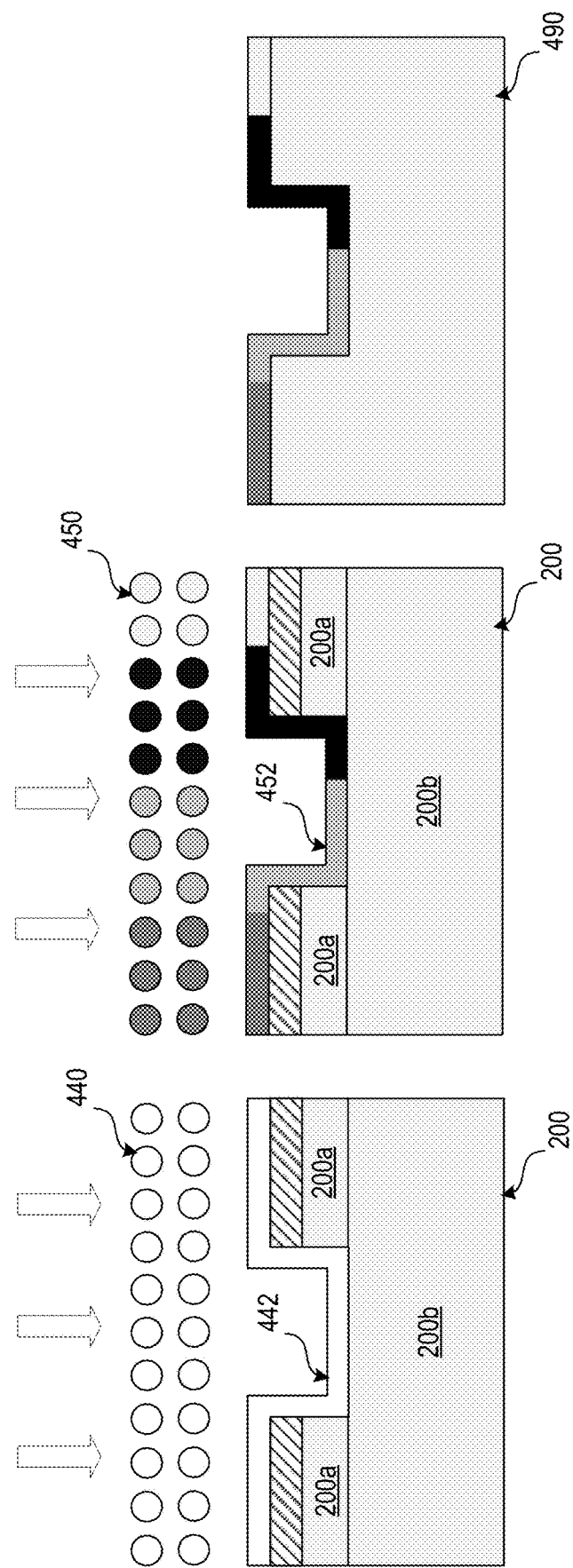
FIGS. 4A-4C show a sequence of illustrative diagrams depicting processing of the first substrate according to the process of FIG. 3.

As previously mentioned, in some embodiments one or more post-processes may be applied after forming the 3D relief according to the introduced technique. It shall be understood that such post-processes are optional and are not required to actually form the relief. FIG. 3 is a flowchart illustrating an example process 300 that can be applied to the substrate after process 100 has been performed. Certain steps of the example process 300 are described with reference to FIGS. 4A-4C which show a sequence of illustrative diagrams depicting the processing of the substrate according to process 300. Certain steps of the example process 300 depicted in FIG. 3 may be performed by one or more components of the automated production system 800 depicted in FIG. 8 and/or the example computing system 900 depicted in FIG. 9. The process 300 described with respect to FIG. 3 is an example provided for illustrative purposes and is not to be construed as limiting. Other processes may include more or fewer steps than depicted while remaining within the scope of the present disclosure. Further, the steps depicted in example process 300 may be performed in a different order than is shown.

As mentioned, and as depicted in the flow chart in FIG. 3, process 300 picks up after process 100 is completed. In an example embodiment, process 300 begins at step 302 by applying a layer of glaze to the surface of the substrate 200. As shown in FIG. 4A, in some embodiments, the glaze may be applied by propelling droplets 440 of glaze at the surface of the substrate 200 to produce a layer 442 of glaze that covers the surface of the substrate 200 including the 3D relief. Droplets of glaze may be propelled using any suitable process such as an inkjet printer (e.g., similar to the application of the binder ink) or any other spraying process (automated or manual). The glaze may also be applied using any other suitable process such brush application (automated or manual) or dipping (automated or manual).

In some embodiments, colored ink may be applied at step 304 after forming the 3D relief in process 100 and/or after applying the glaze at step 302. Color may be applied for decorative purposes or for any other purpose. As shown in FIG. 4B, in some embodiments, the colored ink may be applied, for example, by propelling droplets 450 of one or more colors of ink at the surface of the substrate 200 to produce a layer of color 452 on the surface of the substrate or glaze (if applied). The droplets 450 of colored ink may be propelled using any suitable process such as an inkjet printer (e.g., similar to the application of the binder ink) or any other spraying process (automated or manual). The colored ink may also be applied using any known analog technique such as paintbrush, gravure, screen printing, etc.

In some embodiments, colored ink is applied using inkjet printing based on the same digital image used to print the binder ink in process 100. Using digital inkjet printing to both form the 3D relief and apply decorative color allows the formed relief to match (i.e., align with) the digitally printed color designs. This contrasts with the inherent difficulty in aligning a digitally printed image with a relief formed using an analog process such as stamping. In some embodiments, the colors to be applied during step 304 are defined by data in the digital image itself and/or by additional input received, for example from a user, at step 102.

Depending on the type of substrate used, example process 300 may conclude with, at step 306, firing (i.e., applying heat to) the substrate to produce the final product 490, for example, as depicted at FIG. 4C. Note that the previously defined layers 200a and 200b of substrate 200 have combined through the firing process to produce a final tile product 490. This firing process may similarly be applied without the application of a glaze or decorative color ink. As previously mentioned, a typical industrial ceramic tile process involves firing for approximately 1-2 hours at a temperature between 1030° C. and 1250° C.; however, the specifics of the firing process, if applied, will depend on the material of the substrate.

Figure 5:
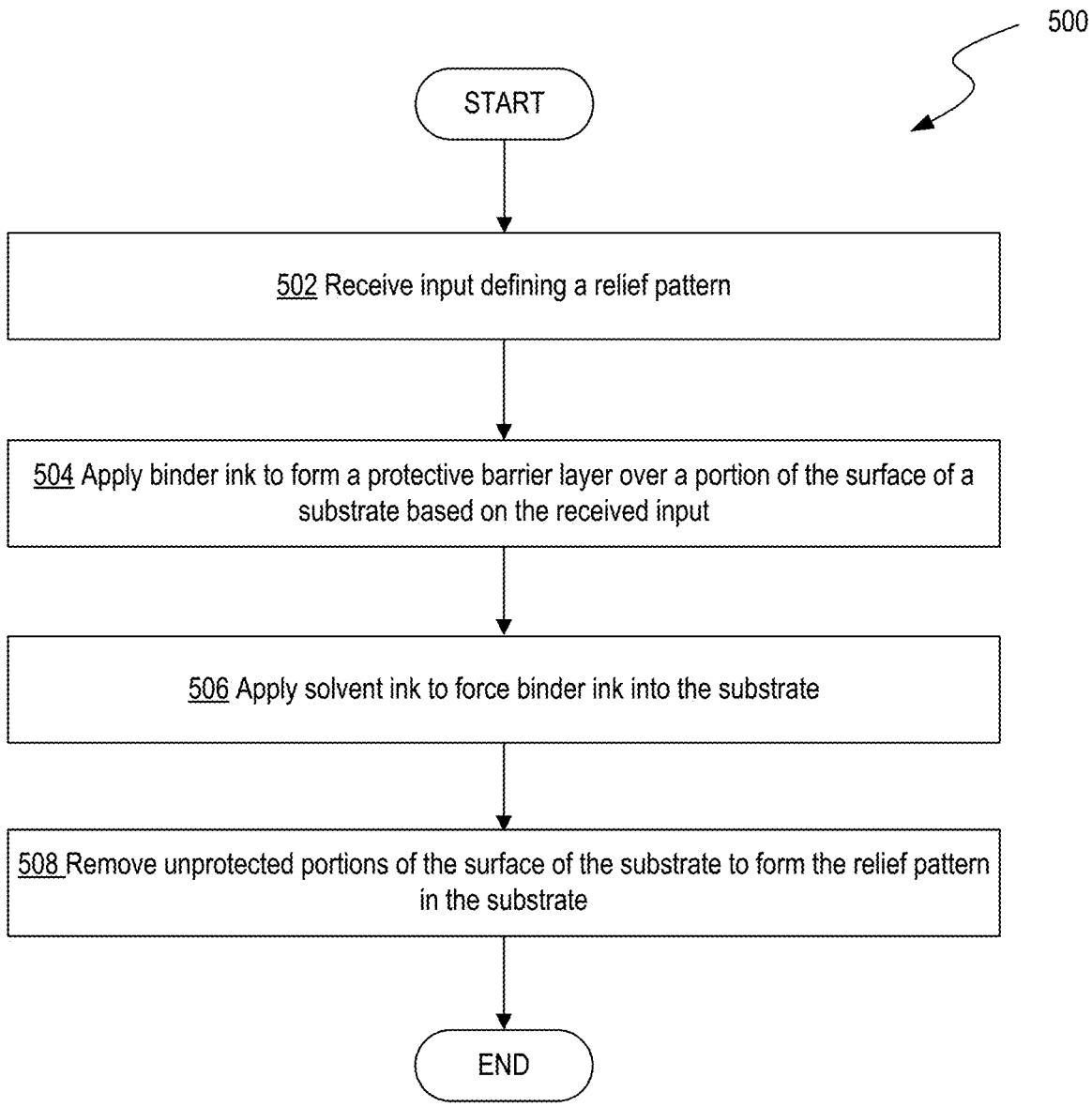
FIG. 5 shows a flowchart illustrating a second example process for applying a 3D relief to a substrate using digital inkjet technology.

The introduced technique can further be used to apply gradient 3D relief to a substrate. FIG. 5 shows a flowchart illustrating a second example process 500 for applying gradient 3D relief to a substrate using digital inkjet technology. Certain steps of the example process 500 are described with reference to FIGS. 6A-6D which show a sequence of illustrative diagrams depicting processing of a substrate according to the introduced technique. Certain steps of the example process 500 depicted in FIG. 5 may be performed by one or more components of the automated production system 800 depicted in FIG. 8 and/or the example computing system 900 depicted in FIG. 9. The process 500 described with respect to FIG. 5 is an example provided for illustrative purposes and is not to be construed as limiting. Other processes may include more or fewer steps than depicted while remaining within the scope of the present disclosure. Further, the steps depicted in example process 500 may be performed in a different order than is shown.

Example process 500 begins at step 502 with receipt of an input defining the relief pattern that will be applied to a substrate such as a ceramic tile. The input received at step 502 may be the same or contain similar data as the input received at step 102 in example process 100 described with respect to FIG. 1. In some embodiments, in addition to defining the relief pattern, the input received at step 502 may define the gradient to be applied in the relief pattern. The gradient may be defined for example, as a separate parameter, for example, input by a user. Alternatively, the gradient may be defined by the digital image included within the input. For example, the digital image may include gradient values (e.g., between black and white) that, when processed by a computer processing system, can be interpreted as a gradient property of the 3D relief to be formed in the substrate.

Figure 6C:
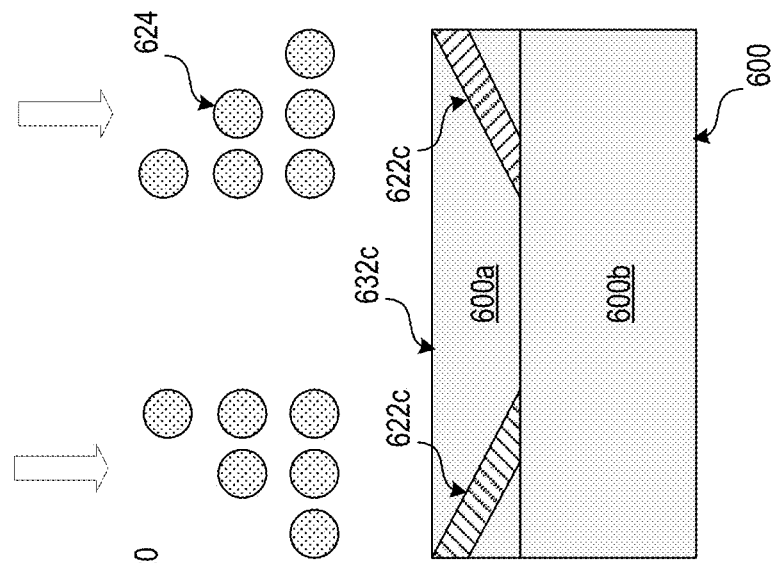
FIGS. 6A-6D show a sequence of illustrative diagrams depicting processing of a second substrate according to the process of FIG. 5.
Figure 6B:
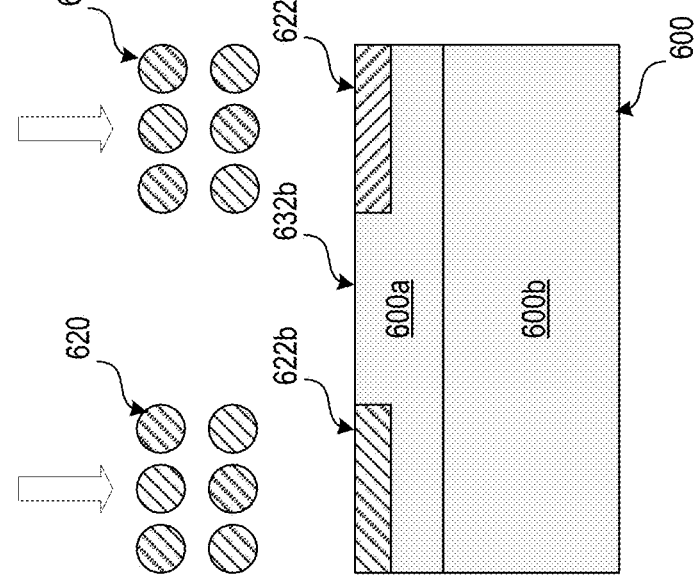
Figure 6A:
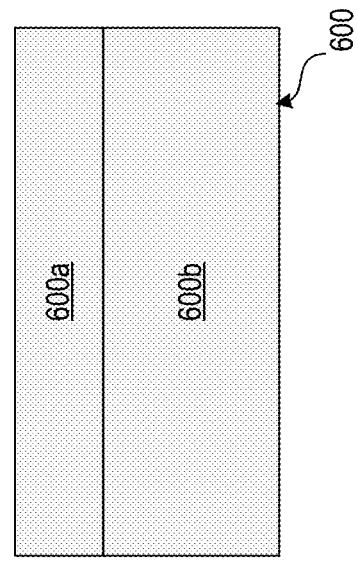

Example process 500 continues at step 504 with applying binder ink to form a protective barrier layer over a portion of the surface of the substrate based upon the input received at step 502. Step 504 of application of binder ink to the surface of a substrate may be the same or similar to step 104 in example process 100 described with respect to FIG. 1. For example, similar to FIG. 2A, FIG. 6A shows a profile view of a substrate 600 which includes a top layer 600a (e.g., a double charge layer) and a bottom layer 600b. FIG. 6B shows a profile view of the same substrate 600 with binder ink applied to form a protective layer over a region of the surface of the substrate 600. As with step 104 in process 100, step 504 may include application of the binder ink using an inkjet process by propelling droplets 620 of the binder ink into the surface of the substrate 600. As a result, the surface of the substrate 600 includes regions 622b that are covered in a layer of binder ink and unprotected regions 632b that are not covered in a layer of binder ink.

Example process 500 continues at step 506 with the application of solvent ink over the applied binder ink to force at least some of the applied binder ink into the substrate. For example, as depicted in FIG. 6C, the solvent ink can be applied using an inkjet process by propelling droplets 624 of solvent ink into the surface of the substrate. Application of the droplets 624 of solvent ink forces at least some of the previously applied binder ink to sink into the substrate 600.

The depth to which the binder ink sinks into the substrate 600 may depend upon the amount of solvent ink applied at any given area. Varying the amount of solvent ink applied across the surface of the substrate 600 (e.g., as indicated by the varying number of droplets 624) can therefore produce a gradient in the protective layer formed by the binder ink within the substrate 600. This is represented in FIG. 6C by the protected regions 622c that are now within the top layer 600a of the substrate 600 and are at an angle relative to the horizontal surface of the substrate.

The depth to which the binder ink sinks within the substrate will also depend upon the material properties of the substrate. In the example depicted in FIG. 6C, the protective layer 622 of binder ink has only sunk as far as the depth of the top layer 600a (e.g., the double charge layer) of the substrate 600. This may be due, for example, to a higher porosity of the top layer 600a relative to the bottom layer 600b. As previously discussed, the introduced technique can similarly be applied in substrates having more or fewer than two layers. Accordingly, in other embodiments, the addition of solvent ink may affect the layer of binder ink differently than as depicted in FIG. 6C.

Although not depicted in FIG. 5, in some embodiments, example process 500 may include waiting for the binder ink to dry or actively applying another process to finalize formation of the protective layer 622c within the substrate 600. For example, in some embodiments, the binder ink may include or be combined with a curable agent that requires a curing process (e.g., application of heat, UV light, etc.) to form the protective layer 622c. As another example, a washing process may be applied to remove excess solvent ink from the substrate 600.

Figure 6D:
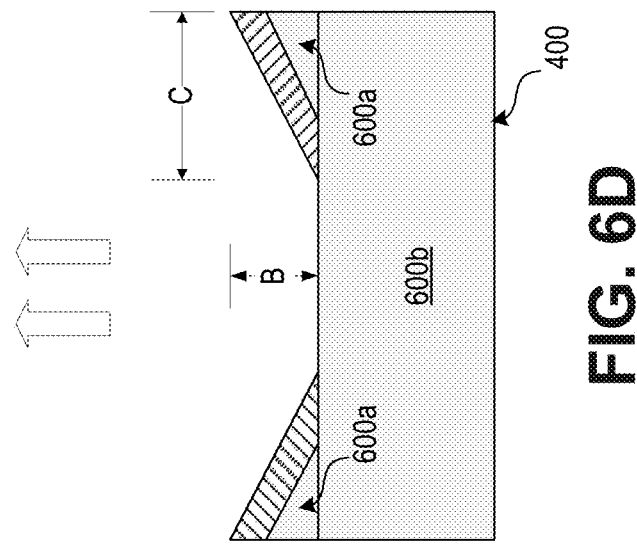

Once a protective layer is formed by application of the binder ink and solvent ink, example process 500 proceeds to step 508 which includes removing material from unprotected regions (e.g., unprotected region 632c) of the surface of the substrate to form the relief pattern in the substrate. For example, FIG. 6D shows the removal of material from the substrate 600 in the unprotected region 632c between the protected regions 622c.

As shown in FIG. 6C, removal of material from the unprotected region 632c of the substrate 600 results in the formation of a 3D relief of depth B relative to the original surface of the substrate 600. In the example depicted in FIG. 6D, the depth B of the 3D relief is equal to the thickness of the top layer 600a of the substrate; however, this may not be the case in all embodiments. For example, in some embodiments, the material of the top layer 600a may exhibit different properties than the material of the bottom layer 600b and the removal process (e.g., brushing) may be specifically calibrated to only remove the material of the top layer 620a. Alternatively, or in addition, the removal process may be calibrated (e.g., based on user input received at step 502) to remove material up to a specified depth B that may differ from the thickness of the top layer 600a. As further depicted in FIG. 6D, the 3D relief formed by the removal process is defined by sloped side walls. In other words, the resulting relief has a gradient. More specifically, the gradient of the resulting relief can be defined based on the ratio between the elevation change of the sloped side walls (i.e., gradient depth B) and the horizontal length C of the sloped side walls. Note that the resulting side walls in the example depicted in FIG. 6D have a constant slope. The introduced technique can similarly be applied to form side walls with varying slope, for example, by adjusting how the solvent ink is applied at step 506.

As previously mentioned, in some embodiments one or more post-processes may be applied after forming the 3D relief according to the introduced technique. Again, FIG. 3 shows a flowchart illustrating an example process 300 that can be applied to a substrate after forming the relief. FIGS. 7A-7C show a sequence of illustrative diagrams depicting the processing of the substrate 600 according to the previously described process 300. Specifically, FIG. 7A shows the application of droplets 740 of glaze to the surface of substrate 600 to form a layer 742 of glaze. FIG. 7B shows the application of droplets 750 of colored ink to produce a layer of color 752 on the surface of the substrate 600 or glaze (if applied). FIG. 7C shows a final product 790 which results from firing the substrate 600.

Figure 8:
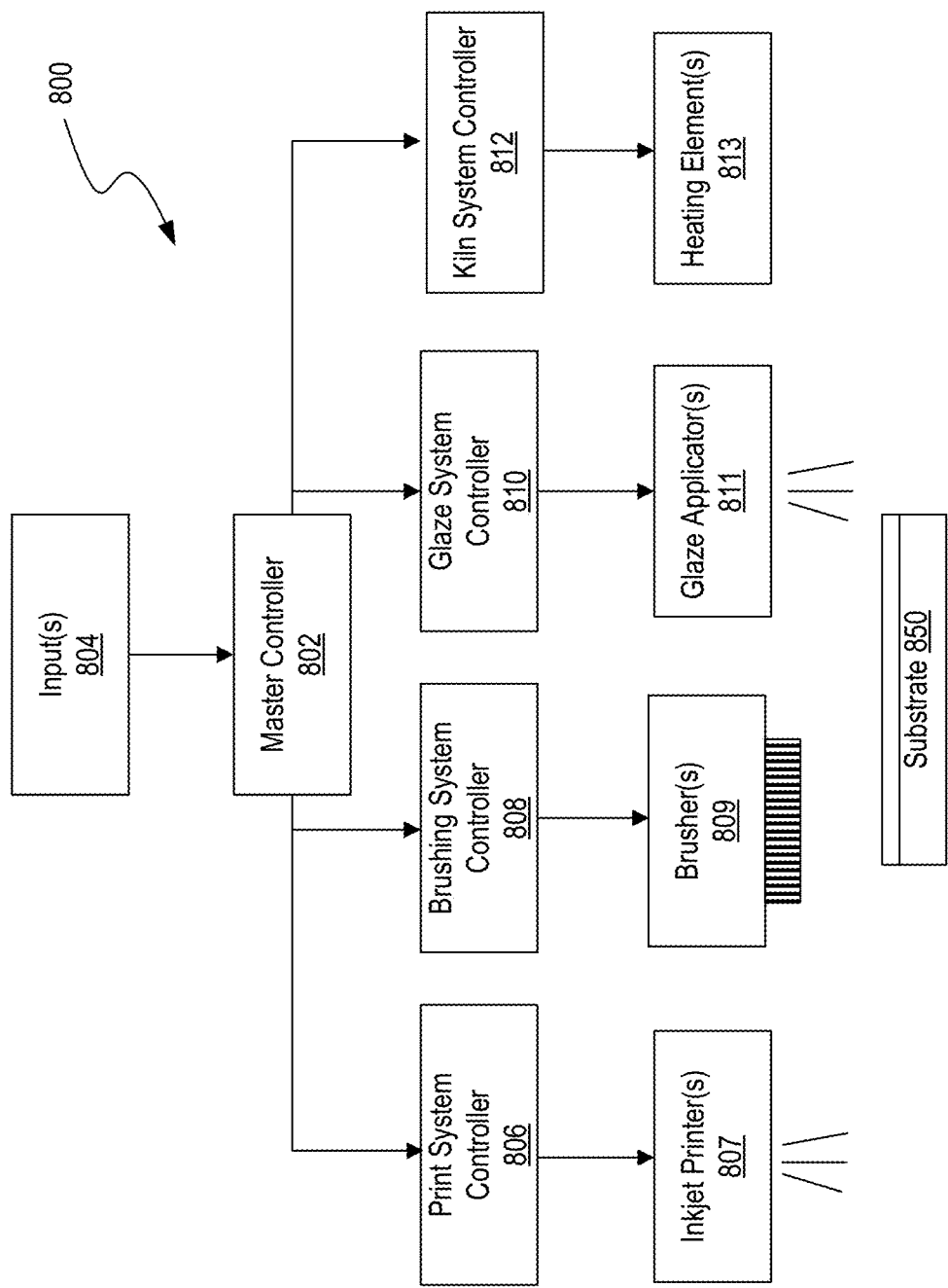
FIG. 8 is a diagram of an example automated production system that can be configured to implement the introduced technique for applying 3D relief to a substrate using digital inkjet technology.

Example Implementation of Applying 3D Relief to a Substrate Using Digital Inkjet Technology FIG. 8 is a diagram of an example automated production system 800 that can be configured to implement the introduced technique for applying 3D relief to a substrate using digital inkjet technology. The automated production system 800 may be configured, for example, to mass produce ceramic tiles with 3D relief using the introduced technique.

The automated production system 800 may include a master controller 802 for the automated production system 800 controls one or more controllers for related subsystems based on received inputs 804. The master controller may include any combination of hardware and/or software configured to receive the inputs 804, process the inputs 804, and generate outputs, for example, in the form of control commands to one or more subsystems based on the processing.

The inputs 804 received by the master controller may include, for example, digital image data and/or any other input as described with respect to steps 102 and 502 of example processes 100 and 500 (respectively).

The automated production system 800 may further include an inkjet printing system configured to apply various types of ink to the surface of a substrate 850. The inkjet printing system may include a print system controller 806 comprising any combination of hardware and/or software configured to receive control commands from the master controller 802, interpret the commands, and generate control commands configured to cause one or more inkjet printers 807 to propel droplets of various types of ink onto the surface of the substrate. The various types of ink may include, for example, binder ink, solvent ink, and color ink. In some embodiments, the inkjet printing system includes multiple inkjet printers each configured to apply to a different type of ink.

The automated production system 800 may further include a brushing system configured to remove material from the surface of a substrate 850 to form 3D relief patterns. The brushing system may include a brushing system controller 808 comprising any combination of hardware and/or software configured to receive control commands from the master controller 802, interpret the commands, and generate control commands configured to cause one or more automated brushers 809 to brush the surface of the substrate 850 to remove material from the surface of the substrate. Although not depicted in FIG. 8, other types of mechanical and/or chemical systems for removal of material from the surface of the substrate 850 may similarly be integrated into an automated production system.

The automated production system 800 may further include a glazing system configured to apply a glaze to the surface of the substrate 850 after the 3D relief has been formed using the inkjet printing system and the brushing system. The glazing system may include a glaze controller 810 comprising any combination of hardware and/or software configured to receive control commands from the master controller 802, interpret the commands, and generate control commands configured to cause one or more glaze applicators 811 to apply a glaze to the surface of the substrate 850. As previously discussed, in some embodiments, glaze maybe applied through inkjet printing, in which case the glazing system may be part of the inkjet printing system. Alternatively, the glazing system may comprise a separate automated system as indicated in FIG. 8.

The automated production system 800 may further include an automated kiln configured to fire the substrate 850 to produce the final tile product. The automated kiln may include a kiln system controller 812 comprising any combination of hardware and/or software configured to receive control commands from the master controller 802, interpret the commands, and generate control commands configured to cause one or more heating elements 813 to apply heat to the substrate 850 to produce the final tile product.

Figure 9:
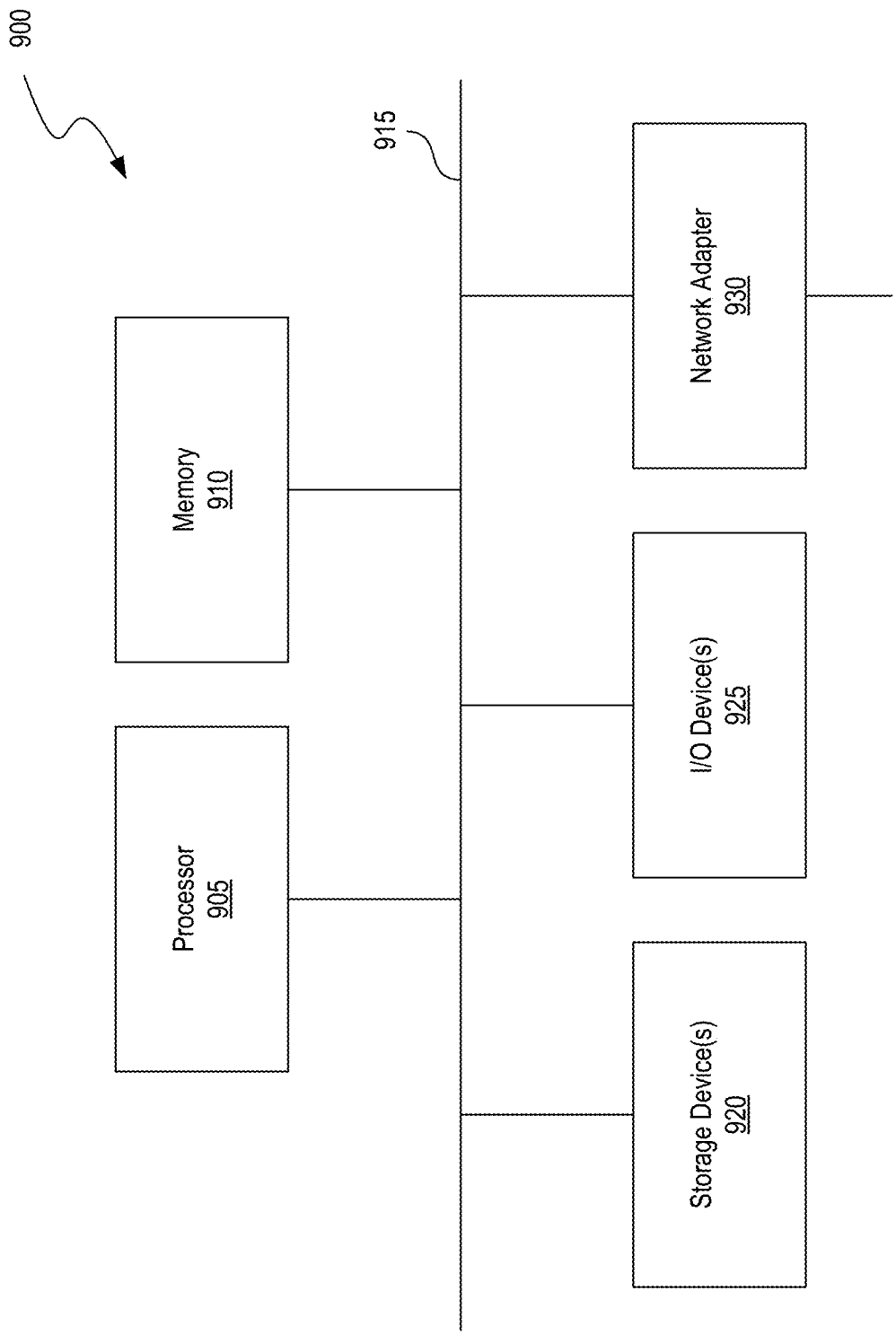
FIG. 9 is a block diagram of an example computing system as may be used to implement certain features of some of the embodiments.

Various components of the automated production system 800, such as the various system controllers 802, 806, 808, 810, and 812 may include one or more of the components of the example computing system 900 described with respect to FIG. 9. It shall be appreciated that the example system 800 described with respect to FIG. 8 is an example and is described in simplified terms for illustrative clarity. A person having ordinary skill will recognize that, in practice, a similar system may include more or fewer components than are shown or may order and arrange the components differently, while still remaining within the scope of the disclosed innovation.

Example Computing System

FIG. 9 is a block diagram of an example computing system 900 as may be used to implement certain features of some of the embodiments. The computing system 900 may be a server computer, a client computer, a personal computer (PC), a user device, a tablet PC, a laptop computer, a personal digital assistant (PDA), a cellular telephone, a telephone, a web appliance, a network router, switch or bridge, a console, a hand-held console, a (hand-held) gaming device, a music player, any portable, mobile, hand-held device, wearable device, or any other machine capable of executing a set of instructions (sequential or otherwise) that specify actions to be taken by that machine.

The computing system 900 may include one or more processing units (e.g., central processing units (CPU) and/or graphical processing units (GPU) (collectively the "processor") 905, one or more memory units (collectively "memory") 910, one or more input/output devices 925 (e.g. keyboard and pointing devices, touch devices, display devices, audio input/output devices, etc.) one or more storage devices 920 (e.g. disk drives, solid state drives, etc.), and one or more network adapters 930 (e.g., network interfaces) that can communicatively couple via an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, an Institute of Electrical and Electronics Engineers (IEEE) standard 1394 bus (also called Firewire), or any other suitable system for facilitating communication between the various components of the example computing system 900.

The memory 910 and storage device 920 are computer-readable storage media that may store instructions that implement at least portions of the various embodiments. In addition, the data structures and message structures may be stored or transmitted via a data transmission medium (e.g., a signal on a communications link). Various communication links may be used such as the Internet, a local area network, a wide area network, or a point-to-point dial-up connection, etc. Thus, computer readable media can include computer-readable storage media, e.g. non-transitory media, and computer-readable transmission media.

The instructions stored in memory 910 can be implemented as software and/or firmware to program the processor 905 to carry out actions described above. In some embodiments such software or firmware may be initially provided to the processer 905 by downloading the software or firmware from a remote system through the computing system 1500, e.g., via network adapter 930.

Figure 10:
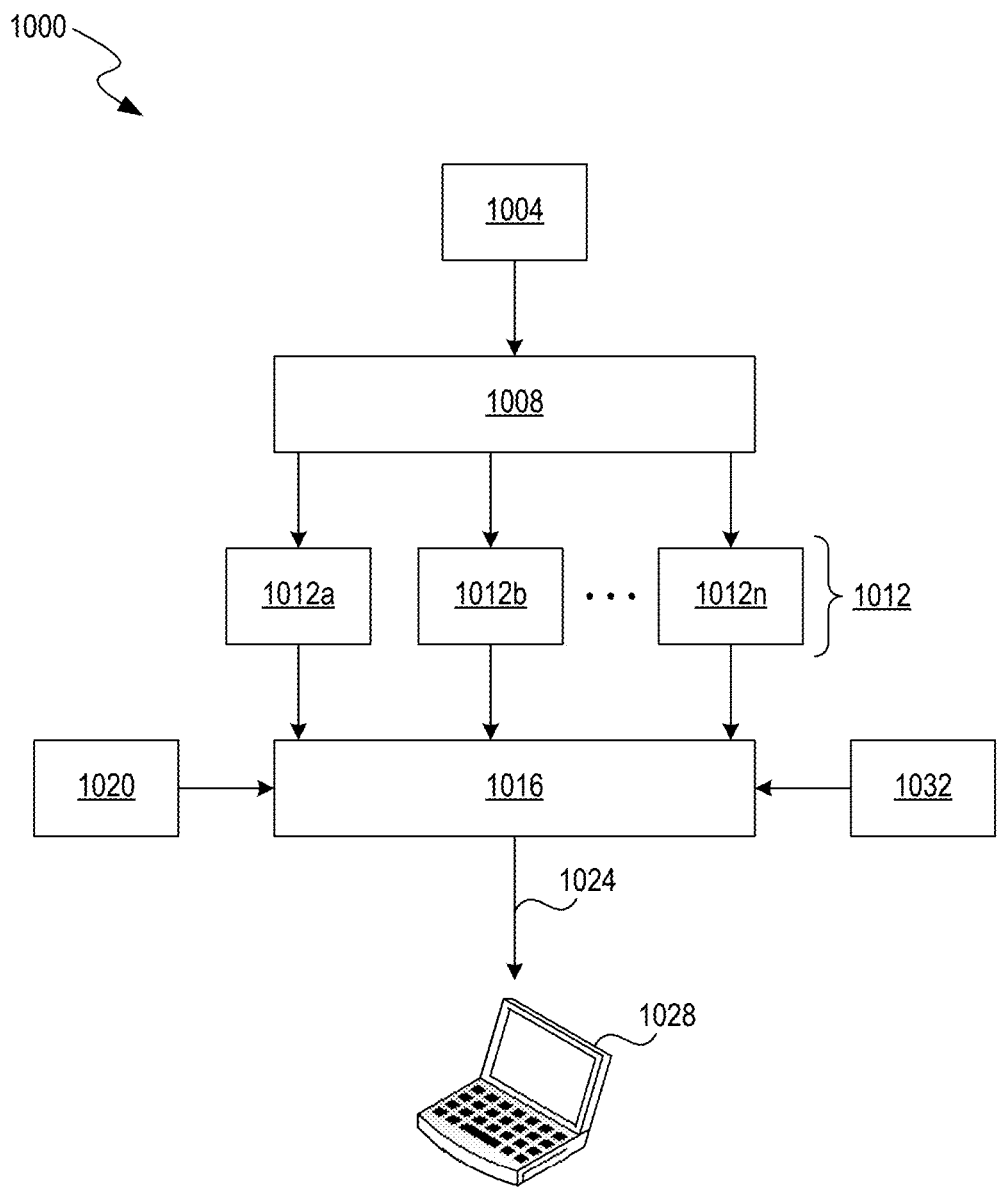
FIG. 10 is a block diagram that illustrates an example machine learning system that can implement aspects of the present technology.

FIG. 10 is a block diagram that illustrates an example machine learning (ML) system 1000 that can implement aspects of the present technology. The ML system 1000 is implemented using components of the example computer system 1100 illustrated and described in more detail with reference to FIG. 11. For example, the ML system 1000 can be implemented on the processor 1102 using instructions 1108 programmed in the memory 1106 illustrated and described in more detail with reference to FIG. 11. Likewise, implementations of the ML system 1000 can include different and/or additional components or be connected in different ways. The ML system 1000 is sometimes referred to as a ML module.

The ML system 1000 includes a feature extraction module 1008 implemented using components of the example computer system 1100 illustrated and described in more detail with reference to FIG. 11. In some implementations, the feature extraction module 1008 extracts a feature vector 1012 from input data 1004. For example, the input data 1004 can be information defining a relief pattern for forming a three-dimensional (3D) relief using an inkjet printer. Examples of such information are described in more detail with reference to FIGS. 1-8. The feature vector 1012 includes features 1012a, 1012b, . . . , 1012n. For example, the feature extraction module 1008 extracts a feature vector from a digital image of a design upon which the relief pattern will be based as described in more detail with reference to FIGS. 1-8.

The feature extraction module 1008 reduces the redundancy in the input data 1004, e.g., repetitive data values, to transform the input data 1004 into the reduced set of features 1012, e.g., features 1012a, 1012b, . . . , 1012n. The feature vector 1012 contains the relevant information from the input data 1004, such that events or data value thresholds of interest can be identified by the ML model 1016 by using this reduced representation. In some example implementations, the following dimensionality reduction techniques are used by the feature extraction module 1008: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate implementations, the ML model 1016 performs deep learning (also known as deep structured learning or hierarchical learning) directly on the input data 1004 to learn data representations, as opposed to using task-specific algorithms. In deep learning, no explicit feature extraction is performed; the features 1012 are implicitly extracted by the ML system 1000. For example, the ML model 1016 can use a cascade of multiple layers of nonlinear processing units for implicit feature extraction and transformation. Each successive layer uses the output from the previous layer as input. The ML model 1016 can thus learn in supervised (e.g., classification) and/or unsupervised (e.g., pattern analysis) modes. The ML model 1016 can learn multiple levels of representations that correspond to different levels of abstraction, wherein the different levels form a hierarchy of concepts. In this manner, the ML model 1016 can be configured to differentiate features of interest from background features.

In alternative example implementations, the ML model 1016, e.g., in the form of a CNN generates the output 1024, without the need for feature extraction, directly from the input data 1004. For example, the output 1024 includes control commands to an inkjet printer and a mechanical brusher to form a 3D relief on a substrate based on a relief pattern. The output 1024 is provided to the computer device 1028 or the computer system described in more detail with reference to FIGS. 3-8. The computer device 1028 is a server, computer, tablet, smartphone, smart speaker, etc., implemented using components of the example computer system 1100 illustrated and described in more detail with reference to FIG. 11. In some implementations, the steps performed by the ML system 1000 are stored in memory on the computer device 1028 for execution. In other implementations, the output 1024 is displayed on the display device 1118 illustrated and described in more detail with reference to FIG. 11.

The ML model 1016 can be a CNN that includes both convolutional layers and max pooling layers. A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing. The architecture of the ML model 1016 can be "fully convolutional," which means that variable-sized test location data vectors can be fed into it. For all convolutional layers, the ML model 1016 can specify a kernel size, a stride of the convolution, and an amount of zero padding applied to the input of that layer. For the pooling layers, the model 1016 can specify the kernel size and stride of the pooling.

In some implementations, the ML system 1000 trains the ML model 1016, based on the training data 1020, to correlate the feature vector 1012 to expected outputs in the training data 1020. For example, the ML model 1016 is trained to configure an inkjet printer to apply binder ink to a first region of a surface of a substrate, and configure a mechanical brusher to brush the surface of the substrate to remove material from a second region of the surface of the substrate, as described in more detail with reference to FIG. 12. As part of the training of the ML model 1016, the ML system 1000 forms a training set of features and training labels by identifying a positive training set of features that have been determined to have a desired property in question, and, in some implementations, forms a negative training set of features that lack the property in question.

The ML system 1000 applies ML techniques to train the ML model 1016, that when applied to the feature vector 1012, outputs indications of whether the feature vector 1012 has an associated desired property or properties, such as a probability that the feature vector 1012 has a particular Boolean property, or an estimated value of a scalar property. The ML system 1000 can further apply dimensionality reduction (e.g., via linear discriminant analysis (LDA), PCA, or the like) to reduce the amount of data in the feature vector 1012 to a smaller, more representative set of data.

The ML system 1000 can use supervised ML to train the ML model 1016, with feature vectors of the positive training set and the negative training set serving as the inputs. In some implementations, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example implementations, a validation set 1032 is formed of additional features, other than those in the training data 1020, which have already been determined to have or to lack the property in question. The ML system 1000 applies the trained ML model 1016 to the features of the validation set 1032 to quantify the accuracy of the ML model 1016. Common metrics applied in accuracy measurement include: Precision and Recall, where Precision refers to a number of results the ML model 1016 correctly predicted out of the total it predicted, and Recall is a number of results the ML model 1016 correctly predicted out of the total number of features that had the desired property in question. In some implementations, the ML system 1000 iteratively re-trains the ML model 1016 until the occurrence of a stopping condition, such as the accuracy measurement indication that the ML model 1016 is sufficiently accurate, or a number of training rounds having taken place.

The validation set 1032 can include monochrome images of designs defining areas corresponding to relief patterns to be printed, polychrome images which define both relief patterns to be applied as well as coloring, parameters including types of substrates (e.g., material type, dimensions, etc.), dimensions of reliefs (e.g., depths, gradients, etc.), data describing post-processes (e.g., glazing, color printing, firing, etc.), or any other relevant parameters. Training data or the information received by a computer system operating the inkjet printer can also include processing data (e.g., data included in the received inputs) by a computer processing system. As an illustrative example, a digital image including a design in black against a white background defining a relief pattern may be processed to invert color values such that the printed portions (i.e., the black portions of the image) define areas of the substrate which will be protected from removal, for example, by brushing. This allows the detected values to be validated using the validation set 1032. The validation set 1032 can be generated based on analysis to be performed.

In some embodiments, ML system 1000 is a generative artificial intelligence or generative AI system capable of generating text, images, or other media in response to prompts. Generative AI systems use generative models such as large language models to produce data based on the training data set that was used to create them. A generative AI system is constructed by applying unsupervised or self-supervised machine learning to a data set. The capabilities of a generative AI system depend on the modality or type of the data set used. For example, generative AI systems trained on words or word tokens are capable of natural language processing, machine translation, and natural language generation and can be used as foundation models for other tasks. In addition to natural language text, large language models can be trained on programming language text, allowing them to generate source code for new computer programs. Generative AI systems trained on sets of images with text captions are used for text-to-image generation and neural style transfer.

Computer System

Figure 11:
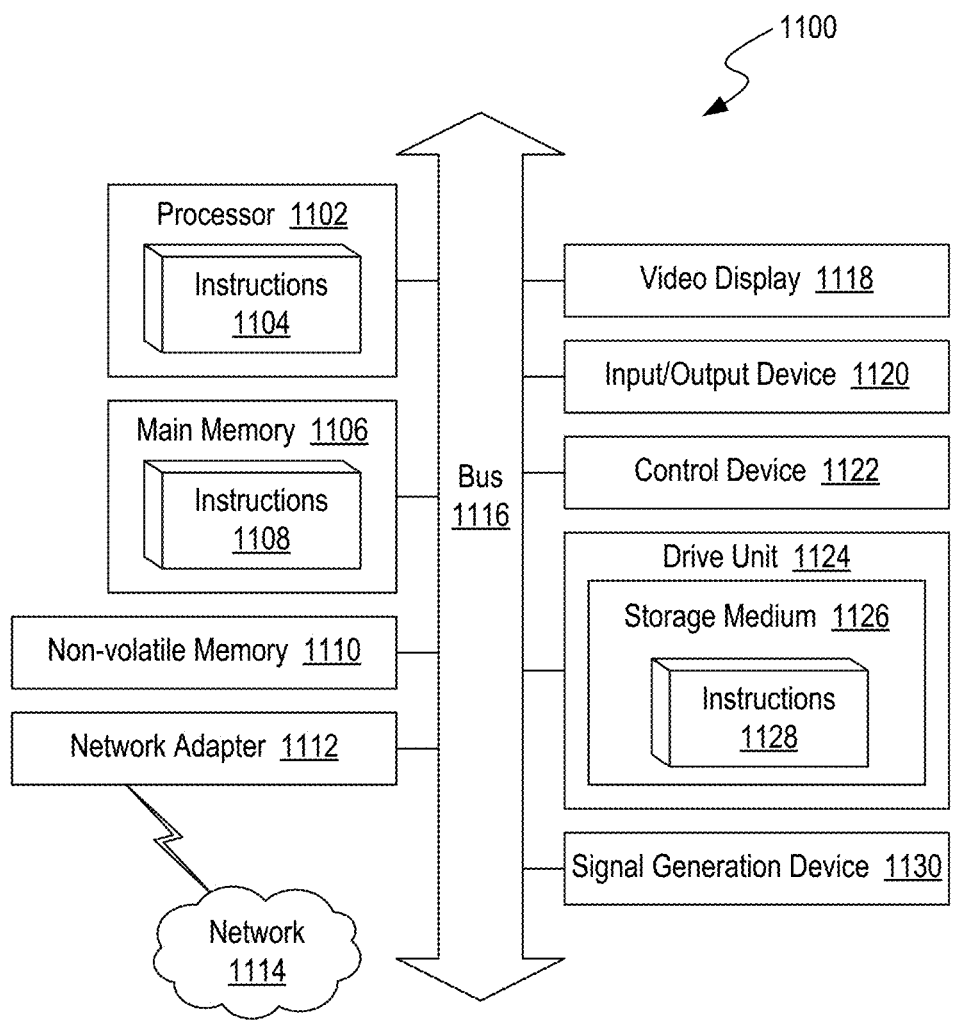
FIG. 11 is a block diagram that illustrates an example of a computer system in which at least some operations described herein can be implemented.

FIG. 11 is a block diagram that illustrates an example of a computer system in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementation, the computer system 1100 can be an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computing system 1100 to mediate data in a network 1111 with an entity that is external to the computing system 1100 through any communication protocol supported by the computing system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

Figure 12:
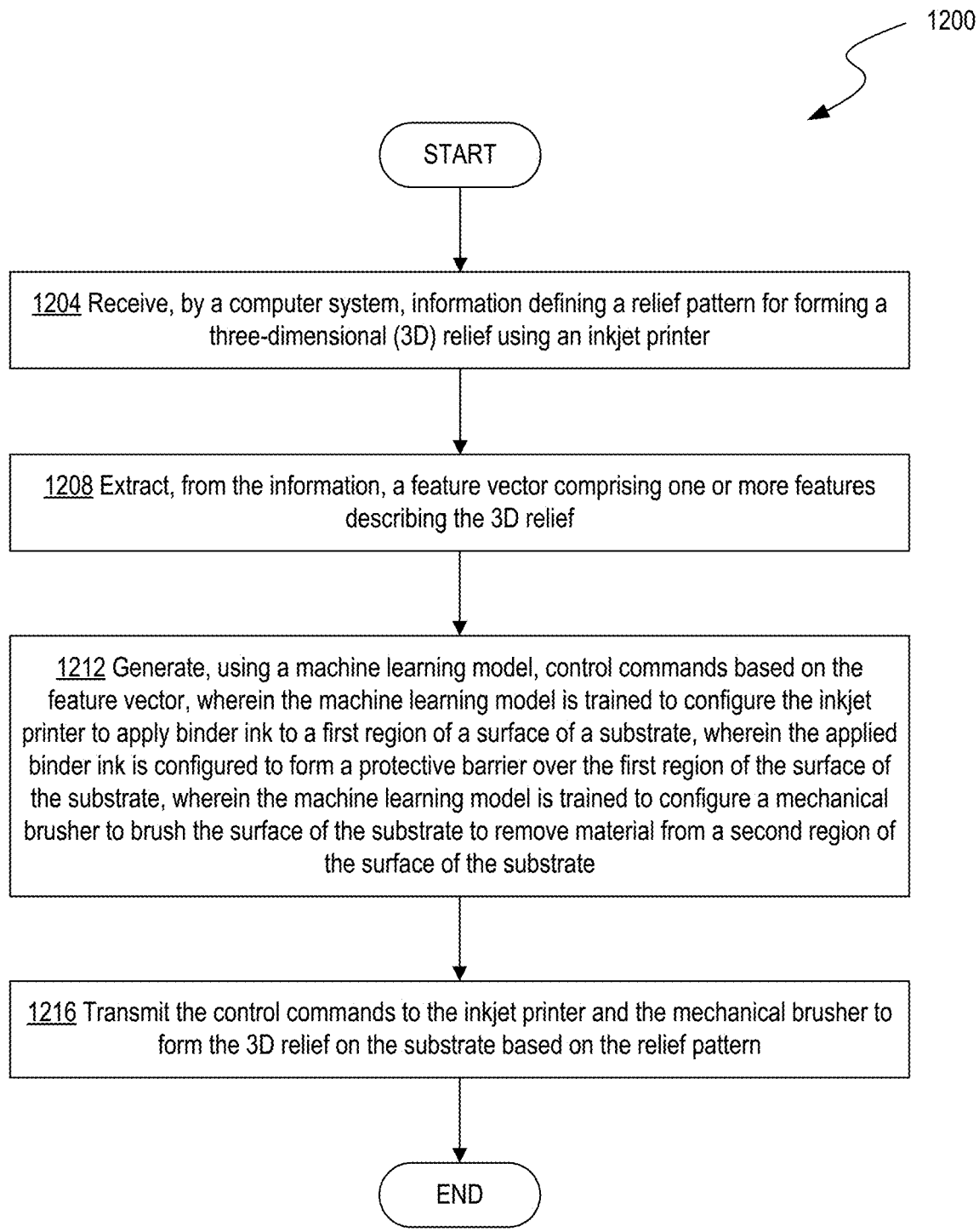
FIG. 12 is a flowchart that illustrates an example process for generating three-dimensional reliefs on tiles using inkjet printing.

FIG. 12 is a flowchart that illustrates an example process for generating three-dimensional (3D) reliefs on tiles using inkjet printing. In some implementations, the process is performed by the printing system 1300 described in more detail with reference to FIG. 13. In some implementations, the process is performed by a computer system, e.g., the example computer system 1100 illustrated and described in more detail with reference to FIG. 11. Particular entities, for example, the controllers and mechanisms illustrated and described in more detail with reference to FIG. 8 perform some or all of the steps of the process in other implementations. Likewise, implementations can include different and/or additional steps or can perform the steps in different orders.

In step 1204, a computer system receives information defining a relief pattern for forming a 3D relief on a substrate using a digital inkjet printer. Examples of the information received (e.g., a digital image file) are described in more detail with reference to FIGS. 1-8. In some embodiments, the information is a polychrome image. Example relief patterns and example 3D reliefs are described in more detail with reference to FIGS. 1-8. Example digital inkjet printers are described in more detail with reference to FIGS. 1-8 and 13-14. In some embodiments, the substrate is a double-charged ceramic tile including a top layer of absorbent material upon which ink can be applied using digital inkjet printing. In some embodiments, the substrate includes at least one of polyvinyl chloride (PVC), polymethyl methacrylate (PMMA), acrylonitrile butadiene styrene (ABS), or luxury vinyl tile (LVT). Example of substrate materials are described in more detail with reference to FIGS. 1-8.

In step 1208, the computer system extracts, from the information, a feature vector including one or more features describing the 3D relief. Example feature vectors are illustrated and described in more detail with reference to FIG. 10.

In step 1212, the computer system generates, using a machine learning model, control commands based on the feature vector. Example machine learning models are illustrated and described in more detail with reference to FIG. 10. Example control commands are described in more detail with reference to FIG. 8. In some embodiments, the machine learning model is trained, based on parameters associated with forming 3D reliefs in substrates.

In some embodiments, the parameters include a material type of the substrate or dimensions of the substrate. Example material types of substrates and dimensions are described in more detail with reference to FIGS. 1-8. In some embodiments, the parameters include a depth of the 3D relief or a gradient of the 3D relief. Example depths and gradient of 3D reliefs are described in more detail with reference to FIGS. 1-8. In some embodiments, the parameters describe at least one of a glazing process, a color printing process, or a firing process. Examples of a glazing process, a color printing process, and a firing process are described in more detail with reference to FIGS. 1-8.

The machine learning model is trained to generate the control commands to configure the digital inkjet printer to apply binder ink to a first region of a surface of the substrate.

Application of binder ink to a region of a surface of a substrate is described in more detail with reference to FIGS. 1-8. The applied binder ink is configured to form a protective layer over the first region of the surface of the substrate. Formation of a protective layer over a region of a surface of a substrate using binder ink is described in more detail with reference to FIGS. 1-8. In some embodiments, the binder ink includes a resin solution.

In some embodiments, the machine learning model is trained to generate the control commands to configure the digital inkjet printer to apply solvent ink to the surface of the substrate after applying the binder ink to the first region of the surface of the substrate. Application of solvent ink is described in more detail with reference to FIGS. 1-8. Applying the solvent ink causes at least some of the binder ink to sink into the surface of the substrate such that the protective layer formed by the binder ink is at a gradient depth relative to the surface of the substrate. The solvent ink is applied before brushing the surface of the substrate.

In some embodiments, the machine learning model is trained to generate the control commands to configure a mechanical brusher to brush the surface of the substrate to remove material from an unprotected second region of the surface of the substrate. Brushing a surface of a substrate to remove material is described in more detail with reference to FIGS. 1-8. Removing the material from the unprotected second region of the surface of the substrate forms a gradient 3D relief. Example gradient 3D reliefs are described in more detail with reference to FIGS. 1-8.

In some embodiments, the machine learning model is trained to generate the control commands to configure the digital inkjet printer to apply color ink to the surface of the substrate after the 3D relief has been formed. Application of color ink to the surface of the substrate after the 3D relief has been formed is described in more detail with reference to FIGS. 1-8. In some embodiments, the machine learning model is trained to generate the control commands to configure a glazing apparatus to apply glaze to the surface of the substrate after the 3D relief has been formed. Application of glaze to a surface of a substrate after a 3D relief has been formed is described in more detail with reference to FIGS. 1-8.

In step 1216, the computer system transmits the control commands to the digital inkjet printer to form the 3D relief on the substrate based on the relief pattern. In some embodiments, the machine learning model is trained to generate the control commands to configure an automated kiln to fire the substrate after the 3D relief has been formed to produce a ceramic tile. Firing a substrate after a 3D relief has been formed is described in more detail with reference to FIGS. 1-8.

Figure 13:
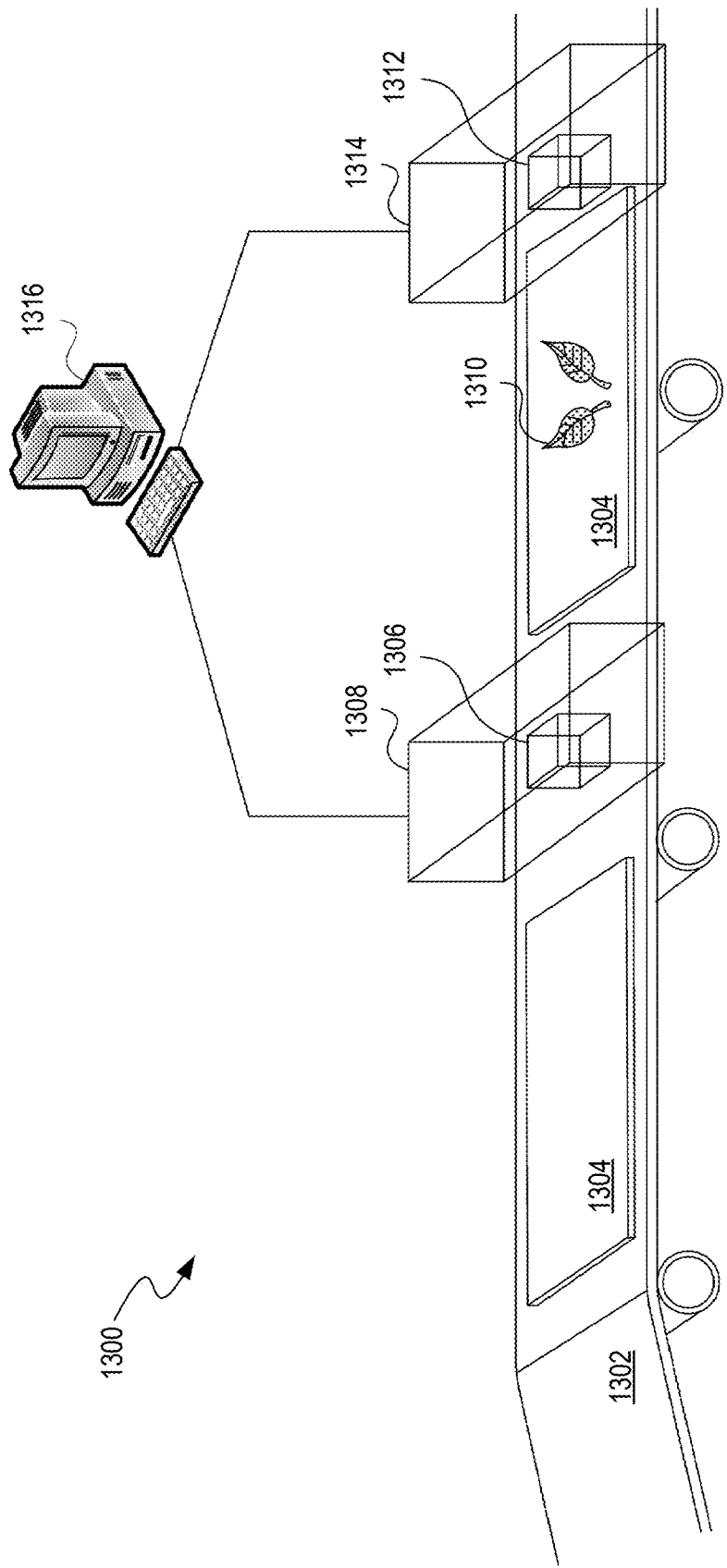
FIG. 13 is a block diagram illustrating a perspective view of a printing system, in accordance with one or more embodiments.

FIG. 13 is a block diagram illustrating a perspective view of a printing system 1300, in accordance with one or more embodiments. The printing system 1300 includes a printer head 1306, at least one light source 1312, and a transfer belt 1302. Embodiments may include various combinations of these and other components, e.g., a dryer. For example, the light source 1312 may be present in some embodiments, but not in others. As another example, a dryer may be included if the image 1310 will not be quickly transferred to a substrate. While the printing system 1300 of FIG. 13 includes a transfer belt 1302, other means for conveying and/or retaining transfer material 1304 can also be used, such as a rotating platform or stationary bed.

The printer head 1306 is configured to deposit ink onto a transfer material 1304 in the form of an image 1310. The transfer material 1304, which may also be referred to as a former material, is flexible, which allows the image 1310 to be transferred to complex-shaped substrates. For example, the transfer material 1304 may be a rubber former, a thermoformable material, etc. In some embodiments, the printer head 1306 is an inkjet printer head that jets ink onto the transfer material 1304 using, for example, piezoelectric nozzles. Thermal printer heads are generally avoided in an effort to avoid premature sublimation of the ink. In some embodiments, the ink is a solid energy, e.g., UV, curable ink. However, other inks may also be used, such as water-based energy curable inks or solvent-based energy curable inks. The ink can be deposited in different forms, such as ink droplets and colored polyester ribbons.

In some embodiments, one or more light sources 1312 cure some or all of the ink deposited onto the transfer material 1304 by emitting UV radiation. The light source(s) 1312 may be, for example, a UV fluorescent bulb, a UV light emitting diode (LED), a low-pressure, e.g., mercury (Hg), bulb, or an excited dimer (excimer) lamp and/or laser. Various combinations of these light sources could be used. For example, a printing system 1300 may include a low-pressure Hg lamp and a UV LED. As discussed in more detail with reference to FIG. 2, the light source 1312 may be configured to emit UV radiation of a particular subtype.

The printer head 1306 and light source 1312 are illustrated as being directly adjacent to one another, i.e., neighboring without any intervening components. However, additional components that assist in printing, curing, etc., may also be present. For example, multiple distinct light sources 1312 may be positioned behind the printer head 1306. FIG. 13 illustrates one possible order in which components may be arranged in order to print an image 1310 onto the former transfer material 1304. Other embodiments are considered in which additional components are placed before, between, or after the illustrated components, etc.

In some embodiments, one or more of the aforementioned components are housed within one or more carriages. For example, the printer head 1306 can be housed within a printing carriage 1308, the light source 1312 can be housed within a curing carriage 1314, etc., In addition to protecting the components from damage, the carriages may also serve other benefits. For example, the curing carriage 1314 can limit what portion(s) of the transfer material 1304 and image 1310 are exposed during the curing process. The printing system 1300 may include pulleys, motors, rails, and/or any combination of mechanical or electrical technologies that enable the carriages to travel along the transfer belt 1302, i.e., with respect to the transfer material 1304. In alternative embodiments, the carriages can be fixedly attached to a rail or base of the printing system 1300. In these embodiments, the transfer material 1304 can be moved in relation to the printer head 1306, light source 1312, etc., such that ink can be deposited onto the transfer material 1304.

In various embodiments, some or all of the components are controlled by a computer system 1316. The computer system 1316 is the same as or similar to the computer system 500 illustrated and described in more detail with reference to FIG. 7. The computer system 1316 can allow a user to input printing instructions and information, modify print settings, e.g., by changing cure settings, alter the printing process, etc.

Figure 14:
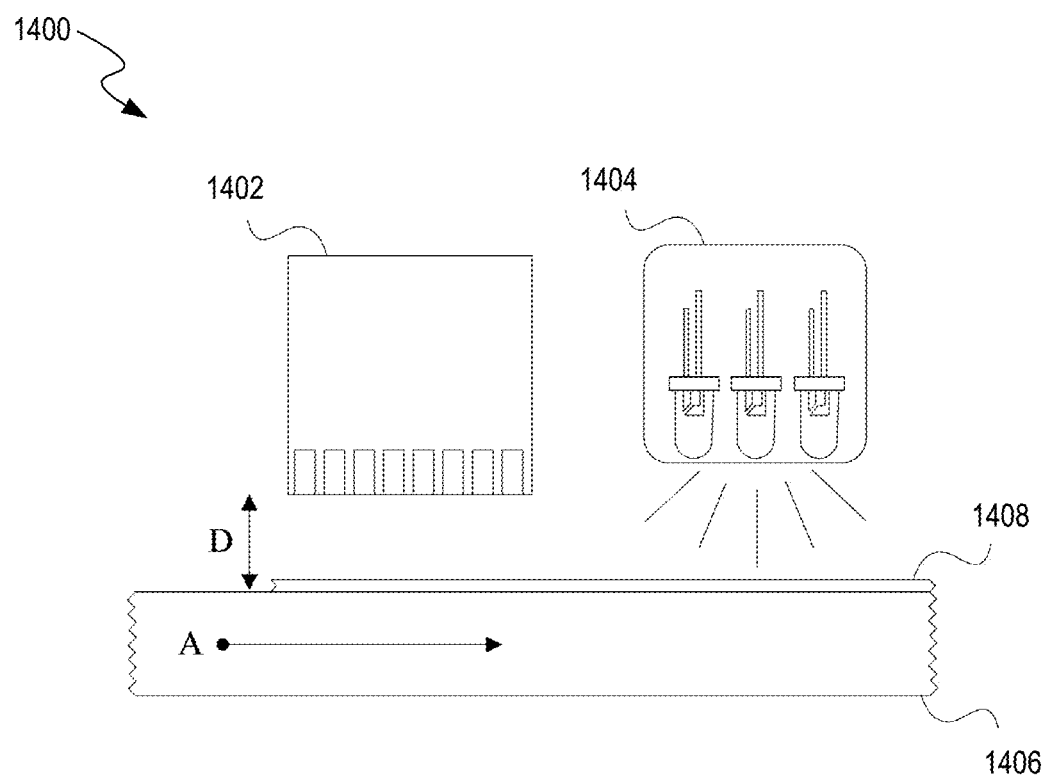
FIG. 14 is a block diagram illustrating a side view of a printing system, including a printer head and a light source, in accordance with one or more embodiments.

FIG. 14 is a block diagram illustrating a side view of a printing system 1400, including a printer head 1402 and a light source 1404, in accordance with one or more embodiments. While a single-pass configuration is illustrated by FIG. 14, other embodiments may employ multi-pass, i.e., scan, configurations. Similarly, embodiments can be modified for various printers, e.g., flatbed printer, drum printer, or lane printer. For example, a flatbed printer may include a stable bed and a traversing printer head, a stable printer head and a traversing bed, etc.

The printer head 1402 can include distinct ink/color drums, e.g., cyan, magenta, yellow, and key (CMYK), or colored polyester ribbons that are deposited onto the surface of a transfer material 1406. Path A represents the media feed direction, e.g., the direction in which the transfer material 1406 travels during the printing process. Path D represents the distance between the printer head 1402 and the surface of the transfer material 1406.

As described above, both direct and indirect printing have conventionally been carried out only on flat surfaces. The printing systems and methods described herein, however, allow images to be printed on complex-shaped, i.e., non-planar, surfaces by depositing ink directly onto a transfer material 1406 and then transferring the ink to a substrate. When printing directly onto a surface, print quality relies on accuracy of ink drop placement. Therefore, maintaining a constant or nearly constant distance between the printer head 1402 and the flat surface of the transfer material 1406 is necessary. Airflow, velocity variability, etc., can affect drop placement even when the change in distance is small, e.g., a few millimeters.

In some embodiments, a light source 1404 cures some or all of the ink 1408 deposited onto the transfer material 1406 by the printer head 1402. The light source 1404 may be configured to emit wavelengths of UV electromagnetic radiation of subtype V (UVV), subtype A (UVA), subtype B (UVB), subtype C (UVC), or any combination thereof. Generally, UVV wavelengths are those wavelengths measured between 395 nanometers (nm) and 445 nm, UVA wavelengths measure between 315 nm and 395 nm, UVB wavelengths measure between 280 nm and 315 nm, and UVC wavelengths measure between 100 nm and 280 nm. However, one skilled in the art will recognize these ranges are somewhat adjustable. For example, some embodiments may characterize wavelengths of 285 nm as UVC.

The light source 1404 may be, for example, a fluorescent bulb, a light emitting diode (LED), a low-pressure, e.g., mercury (Hg), bulb, or an excited dimer (excimer) lamp/laser. Combinations of different light sources could be used in some embodiments. Generally, the light source 1404 is selected to ensure that the curing temperature does not exceed the temperature at which the ink 1408 begins to sublime. For example, light source 1404 of FIG. 14 is a UV LED lamp that generates low heat output and can be used for a wider range of former types. UV LED lamps are associated with lower power consumption, longer lifetimes, and more predictable power output.

Other curing processes may also be used, such as epoxy (resin) chemistries, flash curing, and electron beam technology. One skilled in the art will appreciate that many different curing processes could be adopted that utilize specific timeframes, intensities, rates, etc. The intensity may increase or decrease linearly or non-linearly, e.g., exponentially, logarithmically. In some embodiments, the intensity may be altered using a variable resistor or alternatively by applying a pulse-width-modulated (PWM) signal to the diodes in the case of an LED light source.

The various embodiments introduced herein can be implemented by, for example, programmable circuitry, e.g., one or more microprocessors, programmed with software and/or firmware, or entirely in special-purpose hardwired (non-programmable) circuitry, or in a combination of such forms.

Special-purpose hardwired circuitry may be in the form of, for example, one or more ASICs, PLDs, FPGAs, etc.

We claim:

1. A machine learning-based method for forming a three-dimensional (3D) relief on a substrate, the method comprising:
receiving, by a computer system, information defining a relief pattern for forming the 3D relief using a digital inkjet printer;
extracting, from the information, a feature vector comprising one or more features describing the 3D relief;
generating, using a machine learning model, control commands based on the feature vector,
wherein the machine learning model is trained to generate the control commands to:
configure the digital inkjet printer to apply binder ink to a first region of a surface of the substrate, wherein the applied binder ink is configured to form a protective layer over the first region of the surface of the substrate;
configure the digital inkjet printer to apply solvent ink to the surface of the substrate after applying the binder ink to the first region of the surface of the substrate; and
configure a mechanical brusher to brush the surface of the substrate to remove material from an unprotected second region of the surface of the substrate, wherein removing the material from the unprotected second region of the surface of the substrate forms a gradient 3D relief; and
transmitting the control commands to the digital inkjet printer to form the 3D relief on the substrate based on the relief pattern.

2. The method of claim 1, wherein applying the solvent ink causes at least some of the binder ink to sink into the surface of the substrate such that the protective layer formed by the binder ink is at a gradient depth relative to the surface of the substrate.

3. The method of claim 1, wherein the binder ink includes a resin solution.

4. The method of claim 1, wherein the substrate is a double-charged ceramic tile including a top layer of absorbent material upon which ink can be applied using digital inkjet printing.

5. The method of claim 1, wherein the machine learning model is trained to generate the control commands to:
configure a glazing apparatus to apply glaze to the surface of the substrate after the 3D relief has been formed.

6. The method of claim 1, wherein the machine learning model is trained to generate the control commands to:
configure the digital inkjet printer to apply color ink to the surface of the substrate after the 3D relief has been formed.

7. The method of claim 1, wherein the machine learning model is trained to generate the control commands to:
configure an automated kiln to fire the substrate after the 3D relief has been formed to produce a ceramic tile.

8. A system comprising:
one or more processors; and
a non-transitory, computer-readable storage medium comprising instructions recorded thereon that, when executed by at least one processor of the system, cause the system to:
receive information defining a relief pattern for forming a three-dimensional (3D) relief on a substrate;
extract, from the information, a feature vector comprising one or more features describing the 3D relief;
generate, using a machine learning model, control commands based on the feature vector,
wherein the machine learning model is trained, based on parameters associated with forming 3D reliefs in substrates, to generate the control commands to:
configure a digital inkjet printer to apply binder ink to a first region of a surface of the substrate, wherein the applied binder ink is configured to form a protective layer over the first region of the surface of the substrate; and
configure a mechanical brusher to brush the surface of the substrate to remove material from an unprotected second region of the surface of the substrate, wherein removing the material from the unprotected second region of the surface of the substrate forms a gradient 3D relief; and
send the control commands to the digital inkjet printer to form the 3D relief on the substrate based on the relief pattern.

9. The system of claim 8, wherein the machine learning model is trained to generate the control commands to:
configure the digital inkjet printer to apply solvent ink to the surface of the substrate after applying the binder ink to the first region of the surface of the substrate and before brushing the surface of the substrate.

10. The system of claim 8, wherein the parameters include a material type of the substrate or dimensions of the substrate.

11. The system of claim 8, wherein the parameters include a depth of the 3D relief or a gradient of the 3D relief.

12. The system of claim 8, wherein the parameters describe at least one of a glazing process, a color printing process, or a firing process.

13. The system of claim 8, wherein the substrate includes at least one of polyvinyl chloride (PVC), polymethyl methacrylate (PMMA), acrylonitrile butadiene styrene (ABS), or luxury vinyl tile (LVT).

14. The system of claim 8, wherein the information includes a digital image.

15. A non-transitory, computer-readable storage medium comprising instructions recorded thereon that, when executed by at least one processor of an automated production system, cause the automated production system to:
receive a polychrome image defining a relief pattern for forming a three-dimensional (3D) relief on a substrate;
extract, from the polychrome image, a feature vector comprising one or more features describing the 3D relief;
generate, using a machine learning model, control commands based on the feature vector,
wherein the machine learning model is trained, based on parameters describing types of 3D reliefs or types of substrates, to generate the control commands to:
cause a digital inkjet printer to apply binder ink to a first region of a surface of the substrate, wherein the applied binder ink is configured to form a protective layer over the first region of the surface of the substrate; and
cause a mechanical brusher to brush the surface of the substrate to remove material from an unprotected second region of the surface of the substrate, wherein removing the material from the unprotected second region of the surface of the substrate forms a gradient 3D relief based on the relief pattern.

16. The non-transitory, computer-readable storage medium of claim 15, wherein the machine learning model is trained to generate the control commands to:
    cause the digital inkjet printer to apply solvent ink to the surface of the substrate after applying the binder ink to the first region of the surface of the substrate and before brushing the surface of the substrate,
        wherein applying the solvent ink causes at least some of the binder ink to sink into the surface of the substrate such that the protective layer formed by the binder ink is at a gradient depth relative to the surface of the substrate.

17. The non-transitory, computer-readable storage medium of claim 15, wherein the parameters include a material type of the substrate or dimensions of the substrate.

18. The non-transitory, computer-readable storage medium of claim 15, wherein the parameters include a depth of the 3D relief or a gradient of the 3D relief.

19. The non-transitory, computer-readable storage medium of claim 15, wherein the machine learning model is trained to generate the control commands to:
    configure the digital inkjet printer to apply color ink to the surface of the substrate after the 3D relief has been formed.

20. The non-transitory, computer-readable storage medium of claim 15, wherein the machine learning model is trained to generate the control commands to:
    cause a glazing apparatus to apply glaze to the surface of the substrate after the 3D relief has been formed.

\* \* \* \* \*